United States Patent
Suzuki

(10) Patent No.: US 10,033,735 B2
(45) Date of Patent: Jul. 24, 2018

(54) COMMUNICATION APPARATUS, COMMUNICATION CONTROL METHOD, AND COMPUTER-READABLE RECORDING MEDIUM

(71) Applicant: Ryoichi Suzuki, Kanagawa (JP)

(72) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 190 days.

(21) Appl. No.: 15/059,416

(22) Filed: Mar. 3, 2016

(65) Prior Publication Data
US 2016/0269405 A1 Sep. 15, 2016

(30) Foreign Application Priority Data

Mar. 12, 2015 (JP) ................................ 2015-049943
Feb. 2, 2016 (JP) ................................ 2016-017938

(51) Int. Cl.
*H04L 29/06* (2006.01)
*H04W 4/80* (2018.01)
(Continued)

(52) U.S. Cl.
CPC ......... *H04L 63/0876* (2013.01); *H04W 4/008* (2013.01); *H04W 4/80* (2018.02);
(Continued)

(58) Field of Classification Search
None
See application file for complete search history.

(56) References Cited

U.S. PATENT DOCUMENTS 8,331,910 B2   12/2012   Maeda
2006/0138224 A1   6/2006   Azami et al.
(Continued)

FOREIGN PATENT DOCUMENTS

EP   1670191   6/2006
EP   1670191 A1 *   6/2006   ........... G06Q 20/346
(Continued)

OTHER PUBLICATIONS

The Extended European search report dated Jul. 6, 2016.

*Primary Examiner* — Eric Chen
(74) *Attorney, Agent, or Firm* — IPUSA, PLLC

(57) ABSTRACT

A communication apparatus includes a first communication unit that transmits connection data of a second network to an electronic device by way of a first network, a second communication unit that communicates with the electronic device by way of the second network in accordance with the connection data transmitted by the first communication unit, a storage unit that stores identification data of the electronic device that communicates with the second communication unit, a determination unit that determines whether the electronic device is authorized to communicate by way of the first network based on the identification data of the electronic device stored in the storage unit, and an access control unit that prohibits the electronic device from accessing the communication apparatus by way of the second network when the determination unit determines that the electronic device is not authorized to communicate by way of the first network.

7 Claims, 28 Drawing Sheets

(51) Int. Cl.
  *H04W 12/08* (2009.01)
  *H04W 4/00* (2018.01)
  *H04W 36/00* (2009.01)
  *H04W 36/14* (2009.01)
  *G06F 7/04* (2006.01)
  *G06F 15/16* (2006.01)
  *G06F 17/30* (2006.01)
  *H04W 84/12* (2009.01)

(52) U.S. Cl.
  CPC ....... *H04W 12/08* (2013.01); *H04W 36/0077* (2013.01); *H04W 36/14* (2013.01); *H04L 63/102* (2013.01); *H04L 63/107* (2013.01); *H04L 63/18* (2013.01); *H04W 84/12* (2013.01)

(56) References Cited

U.S. PATENT DOCUMENTS

| | | | | |
|---|---|---|---|---|
| 2013/0178163 A1* | 7/2013 | Wang | ................... | H04W 4/008 455/41.2 |
| 2013/0309971 A1 | 11/2013 | Kiukkonen et al. | | |
| 2014/0127994 A1* | 5/2014 | Nightingale | .......... | H04W 4/008 455/41.1 |
| 2014/0149742 A1* | 5/2014 | Yau | ....................... | H04L 63/083 713/159 |
| 2015/0003433 A1 | 1/2015 | Sinha et al. | | |
| 2015/0038080 A1* | 2/2015 | Stroud | ................ | H04B 5/0031 455/41.1 |
| 2015/0099469 A1* | 4/2015 | Goldstein | ............... | H04L 67/24 455/41.2 |
| 2015/0109142 A1* | 4/2015 | Mejegard | ............... | G06Q 10/06 340/870.07 |
| 2015/0177711 A1* | 6/2015 | Yuzurihara | ........ | H05B 37/0227 700/56 |
| 2015/0334511 A1* | 11/2015 | Rivera | .................... | G06F 21/44 455/41.2 |
| 2016/0081009 A1* | 3/2016 | Tailor | .................... | H04W 48/16 455/432.1 |
| 2016/0149884 A1* | 5/2016 | Kojima | .............. | G07C 9/00309 340/5.61 |

FOREIGN PATENT DOCUMENTS

| | | |
|---|---|---|
| EP | 2665237 | 11/2013 |
| JP | 2004-304315 | 10/2004 |
| JP | 2005-148924 | 6/2005 |
| JP | 5306460 | 10/2013 |

\* cited by examiner

COMMUNICATION APPARATUS, COMMUNICATION CONTROL METHOD, AND COMPUTER-READABLE RECORDING MEDIUM

BACKGROUND OF THE INVENTION

1. Field of the Invention

The present invention relates to a communication apparatus, a communication control method, and a computer-readable recording medium.

2. Description of the Related Art

Conventionally, technology for supplying access setting information (e.g., SSID, user name, access key, password) for establishing access authorization in a wireless LAN (Local Area Network) or the like is available.

There is also known an access authorization changing method that dynamically changes authorization for accessing a CSG (Closed Subscriber Group) cell without experiencing any mismatch between a white list on the terminal side and a white list on the core network side (see, for example, Japanese Registered Patent No. 5306460).

With a conventional access authorization changing method, a core network apparatus includes a white list indicating cells that can be accessed by each terminal whereas each terminal includes a white list indicating cells that can be accessed by the terminal itself. Thereby, both of the white lists are updated.

Conventionally, a communication system stores access setting information for electronic devices having established access authorization in the wireless LAN. The electronic devices can access the wireless LAN again by using the access setting information stored in the communication system. However, it is difficult for the conventional communication system to prevent access of an electronic device containing access setting information that is capable of accessing the electronic device as long as the electronic device is within a communication region of the wireless LAN.

For example, in a secured area such as a conference room, it is difficult to maintain security inside the communication region of the wireless LAN if the wireless terminal can access another wireless terminal by using the access setting information retained in the wireless terminal.

SUMMARY OF THE INVENTION

The present invention provides a communication apparatus, a communication control method, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a communication apparatus, a communication control method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a communication apparatus for communicating with at least one electronic device. The communication apparatus includes a first communication unit that transmits connection data of a second network to the at least one electronic device by way of a first network, a second communication unit that communicates with the at least one electronic device by way of the second network in accordance with the connection data transmitted by the first communication unit, a storage unit that stores identification data of each of the at least one electronic device that communicates with the second communication unit, a determination unit that determines whether the at least one electronic device can communicate by way of the first network based on the identification data of each of the at least one electronic device stored in the storage unit, and an access control unit that prohibits the at least one electronic device from accessing the communication apparatus by way of the second network when the determination unit determines that the at one electronic device cannot communicate by way of the first network.

Other objects, features and advantages of the present invention will become more apparent from the following detailed description when read in conjunction with the accompanying drawings.

DETAILED DESCRIPTION OF THE PREFERRED EMBODIMENTS

Next, embodiments of the present invention are described.
[First Embodiment]
<System Configuration>

Figure 1:
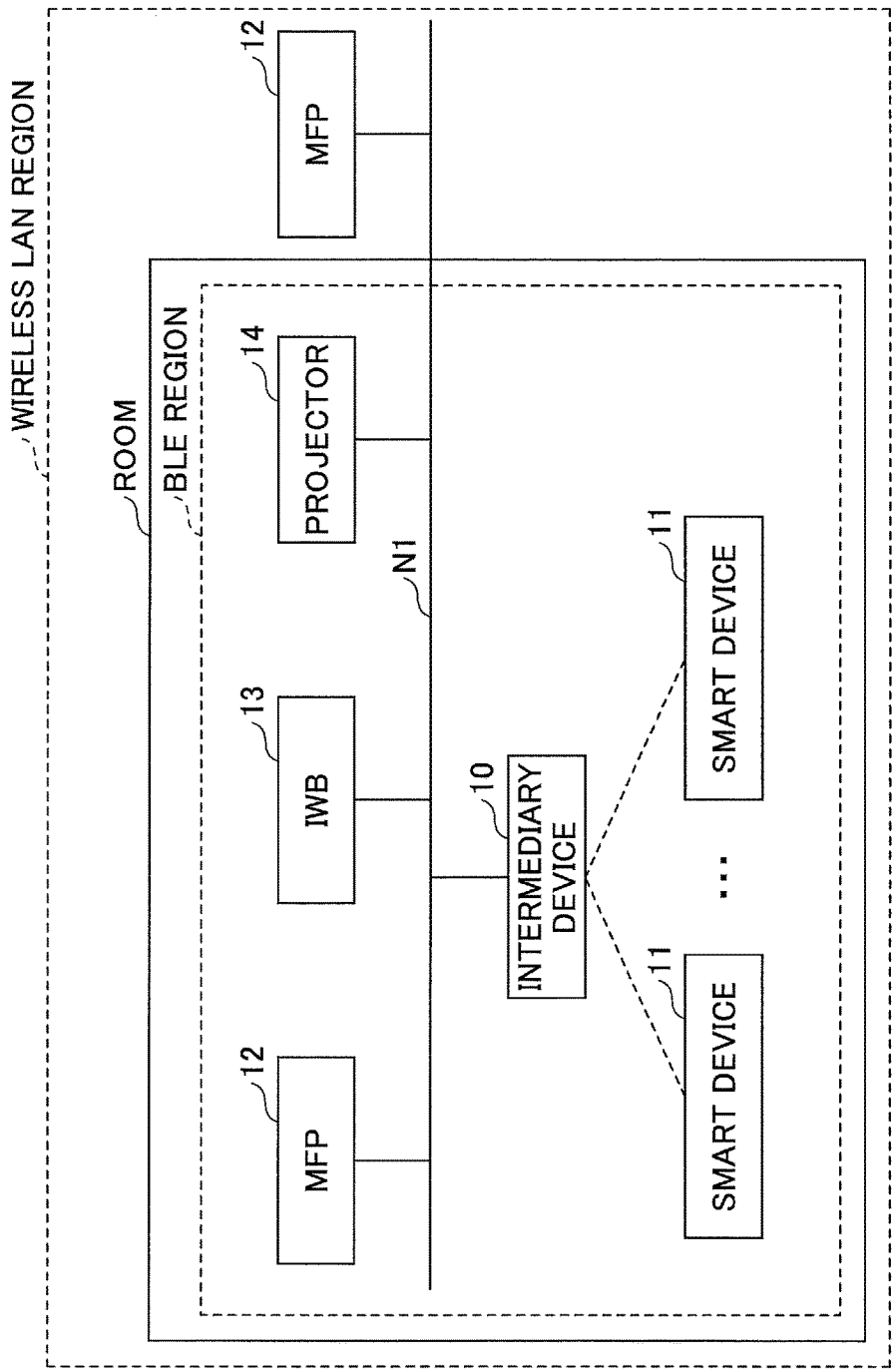
FIG. 1 is a schematic diagram illustrating a communication system according to an embodiment of the present invention.

FIG. 1 is a schematic diagram illustrating a communication system according to an embodiment of the present invention. The communication system 1 illustrated in FIG. 1 includes an intermediary device 10, one or more smart devices 11, an MFP (Multi Function Peripheral) 12, an IWB (Interactive White Board) 13, and a projector 14.

In the communication system 1, the intermediary device 10, the MFP 12, the IWB 13, and the projector 14 are connected to a network N1 such as a LAN (Local Area Network). The communication system 1 enables the intermediary device 10 to access one or more smart devices 11 by way of wireless LAN communication and BLE (Bluetooth (registered trademark) Low Energy) communication.

In FIG. 1, the dotted area indicated as "BLE region" represents an area capable of communicating with the intermediary device 10 by way of BLE communication. In FIG. 1, the BLE region exists within a room. The dotted area indicated as "wireless LAN region" represents an area capable of communicating with the intermediary device 10 by way of wireless LAN communication. In FIG. 1, the wireless LAN region extends beyond the size of the room. Note that the sizes of the BLE region and the wireless LAN region are merely examples. The BLE region and the wireless LAN region may have other sizes as long as the wireless LAN region is larger than or equal to the BLE region. The network N1 may use wireless LAN communication or wired LAN communication. The network N1 includes, for example, an infrastructure type network that communicates through an access point or a peer-to-peer type network that communicates without going through an access point.

The intermediary device 10 is implemented by, for example, a wireless LAN router. The intermediary device 10 can communicate with the smart device 11 that has entered the BLE region by way of BLE communication. The intermediary device 10 uses BLE communication to provide access setting data (connection data) to the smart device 11 that has entered the BLE region. Note that BLE communication is an example of near field communication.

The smart device 11 is an electronic device operated by a user. The smart device 11 may be terminals such as a smartphone, a mobile phone, a laptop computer (PC), or a tablet terminal. The smart device 11 can access the intermediary device 10 by using BLE communication and wireless LAN communication.

The MFP 12, the IWB 14, and the projector 14 are examples of electronic devices that communicate with the smart device 11. The MFP 12 includes functions such as an imaging (photographing) function and an image forming function. The IWB 13 is an example of an image display apparatus. The projector 14 is an example of an image projecting apparatus. As illustrated in FIG. 1, electronic devices such as the MFP 12 may be positioned outside the BLE region. Alternatively, an electronic device such as a printer, a scanner, a facsimile machine, a multi-function device (image forming apparatus) including one or more of the printer, scanner, and the facsimile machine, a camera (imaging apparatus), an electronic blackboard, a monitor (display apparatus), a projector (projecting apparatus), a conference terminal (e.g., TV conference terminal), a microphone (audio input apparatus), a speaker (audio output apparatus), may be used instead of the smartphone 11 to access the intermediary device 10 by way of BLE communication and wireless LAN communication.

<Hardware Configuration>
<<Intermediary Device>>

Figure 2:
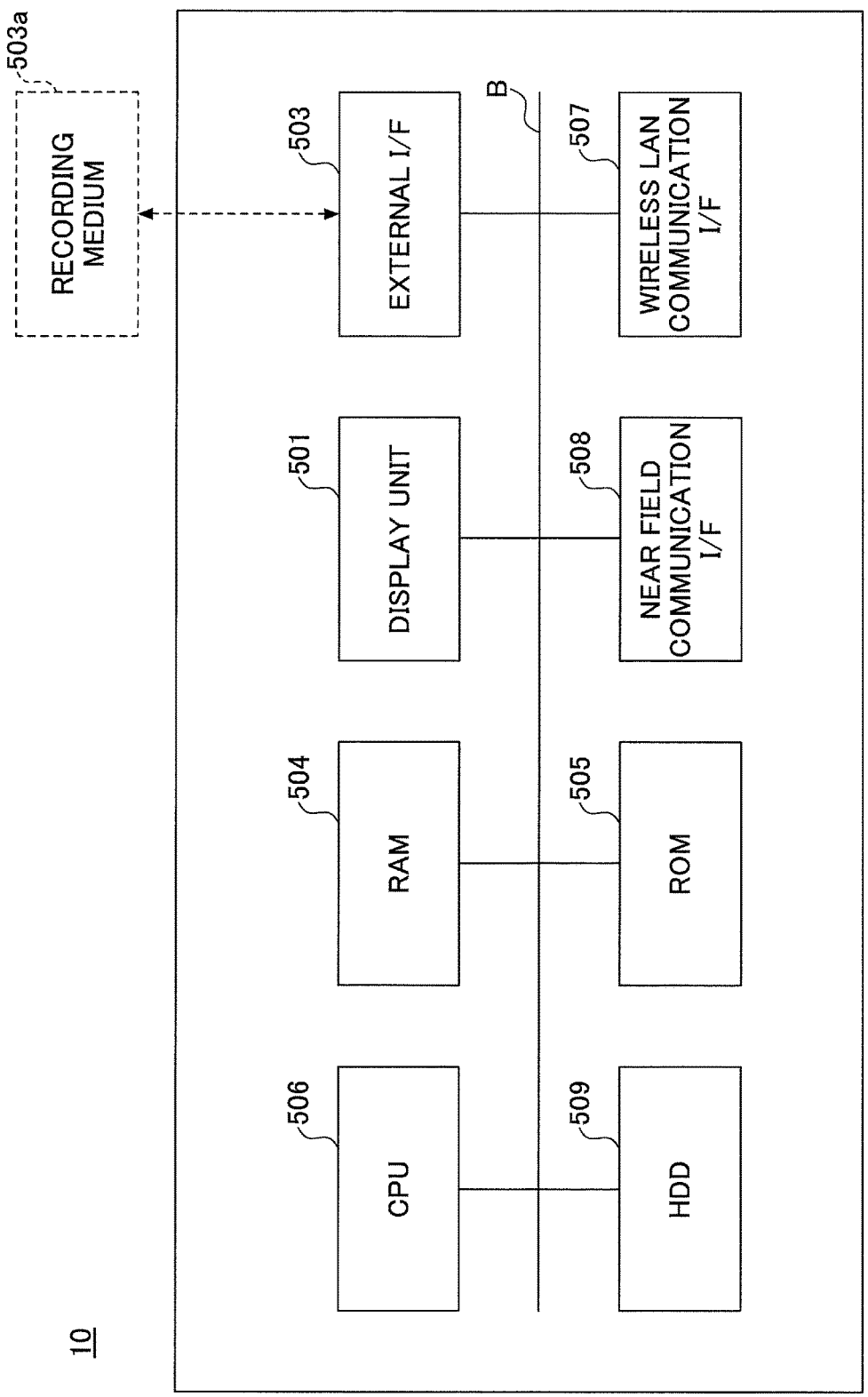
FIG. 2 is a hardware configuration of an intermediary device according to an embodiment of the present invention.

The intermediary device 10 may be implemented, for example, by using a hardware configuration illustrated in FIG. 2. FIG. 2 is a hardware configuration of the intermediary device 10 according to an embodiment of the present invention.

The intermediary device 10 includes, for example, a display part 501, an external I/F 503, a RAM (Random Access Memory) 504, a ROM (Read Only Memory) 505, a CPU (Central Processing Unit) 506, a wireless LAN communication I/F 507, a near field wireless communication I/F 508, and a HDD (Hard Disk Drive) 509 that are connected to each other by a bus B.

The display part 501 uses an LED (Light Emitting Diode) or the like to display, for example, the status of the intermediary device 10. The wireless LAN communication I/F 507 performs wireless LAN communication with electronic devices such as the smart device 11 and the projector 14. Further, the near field wireless communication I/F 508 performs near field wireless communication with the smart device 11.

Further, the HDD 509 is an example of a non-volatile storage device that stores programs and data therein. The programs and data stored in the HDD 509 may include, for example, an OS serving as basic software for controlling the entire intermediary device 10, and application software (hereinafter also referred to as "application") for providing various functions by way of the OS. Alternatively, the intermediary device 10 may use a drive using a flash memory as a recording medium (e.g., SSD (Solid State Drive) instead of the HDD 509.

The external I/F 503 is an interface with an external device. The external device may be, for example, a recording medium 503a. Thereby, the intermediary device 10 can read data from and/or write data to the recording medium 503a by way of the external I/F 503. The recording medium 503a may be, for example, a flexible disk, a CD (Compact Disc), a DVD (Digital Versatile Disc), an SD (Secure Digital) memory card, or a USB (Universal Serial Bus) memory.

The ROM 505 is an example of a non-volatile memory (storage device) that can retain programs and data even when electric power is turned off. For example, programs and data (e.g., (e.g., BIOS, OS settings, network settings) that are executed when the intermediary device 10 is activated are stored in the ROM 505. The RAM 504 is an example of a volatile semiconductor memory (storage device) that temporarily stores programs and data therein.

The CPU 506 is an operation device that implements the controls and functions of the entire intermediary device 10 by reading programs and data from storage devices such as the ROM 505 and the HDD 509, loading the programs and data to the RAM 504, and executing the processes of the program and data loaded to the RAM 504. The intermediary device 10 can implement the below-described processes by using, for example, the hardware configuration illustrated in FIG. 2.

<<Smart Device>>

Figure 3:
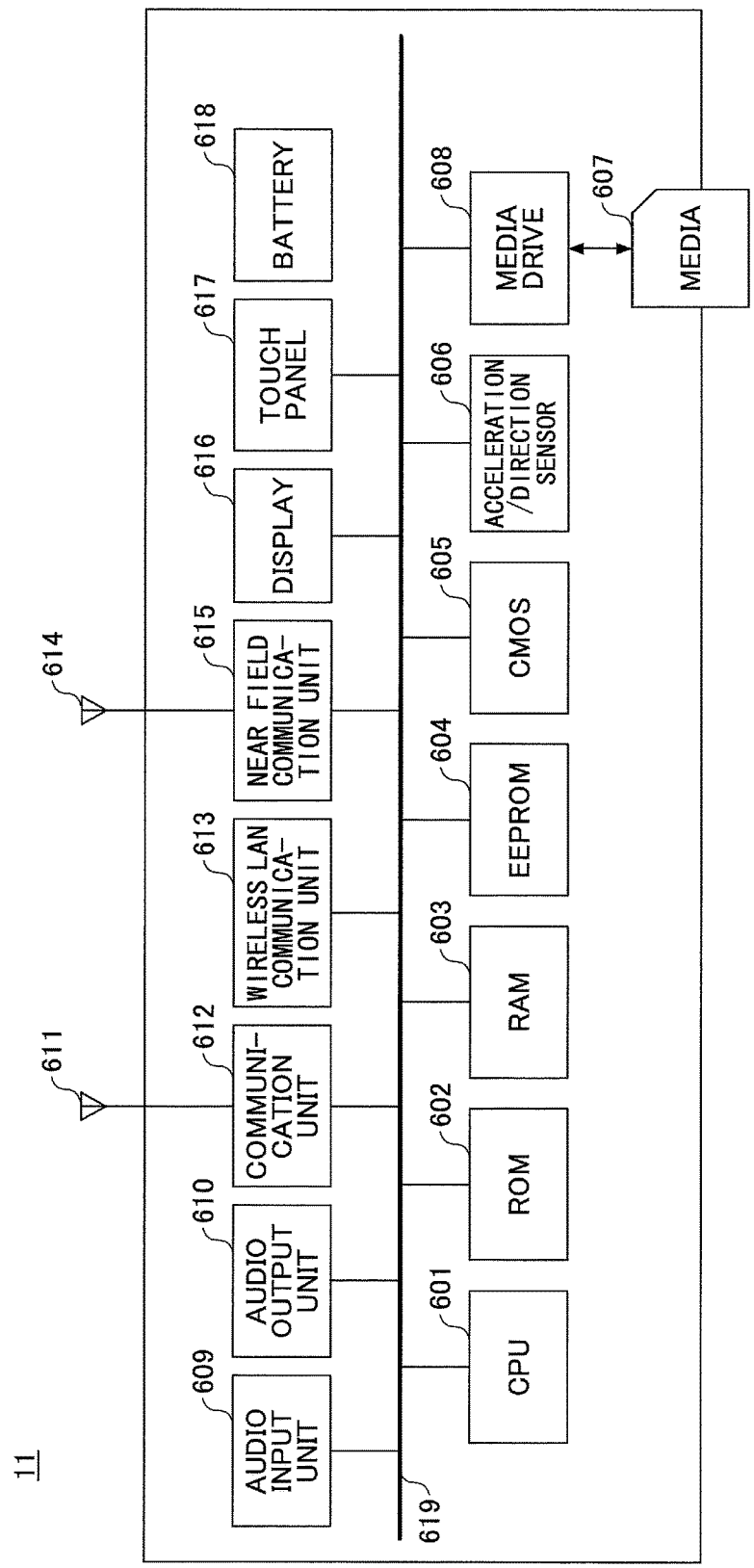
FIG. 3 is a hardware configuration of a smart device according to an embodiment of the present invention.

FIG. 3 is a hardware configuration of a smart device according to an embodiment of the present invention. The smart device 11 of FIG. 3 includes, for example, a CPU 601, a ROM 602, a RAM 603, an EEPROM 604, a CMOS sensor 605, an acceleration/direction sensor 606, and a media drive 608.

The CPU 601 controls all the operations of the smart device 11. The ROM 602 stores basic input/output programs therein. The RAM 603 is used as a work area of the CPU 601. The EEPROM 604 reads data or writes data according to the control of the CPU 601. The CMOS sensor 605 photographs an object and obtains image data of the object according to the control of the CPU 601. The acceleration/direction sensor 606 may be, for example, an electromagnetic compass that detects geomagnetism, a gyro compass, or an acceleration sensor.

The media drive 608 controls the reading and writing (storage) of data performed on recording media 607 such as a flash memory. The recording media 607 can be detachably attached to the media drive 608, so that data recorded on the recording media 607 can be read out from the recording media 607 or data can be recorded and stored in the recording media 607.

The EEPROM 604 stores, for example, OS executed by the CPU 601 and application data required for setting a network. The applications for executing various processes of this embodiment are stored in, for example, the EEPROM 604 or the recording media 607.

The CMOS sensor 605 is, for example, a CCD (Charge Coupled Device) that converts light into electric charges to digitize an image of an object. The CMOS sensor 605 may be other charge coupled devices as long as an object can be imaged.

The smart device 11 includes an audio input unit 609, an audio output unit 610, an antenna 611, a communication unit 612, a wireless LAN communication unit 613, a near field wireless communication antenna 614, a near field wireless communication unit 615, a display 616, a touch panel 617, and a bus line 619.

The audio input unit 609 converts sound into audio signals. The audio output unit 609 converts audio signals into sound. The communication unit 612 uses the antenna 11 to communicate with a nearest base station apparatus by way of wireless communication signals. The wireless LAN communication unit 613 performs wireless LAN communication with an access point according to the IEEE 80411 standard. The near field wireless communication unit 615 uses the near field wireless communication antenna 614 to perform near field wireless communication such as BLE communication.

The display 616 is, for example, a liquid crystal display or an organic electro luminescence (EL) display that display an image of an object, various icons or the like. The touch panel 617 is placed on the display 616 and constituted by a pressure-sensitive or electrostatic panel. The touch panel 617 that is touched with a finger, a touch pen or the like detects a touch position on the display 616. The bus line 619 may be, for example, an address bus or a data bus that is electrically connected to each of the above-described units of the smart device 11.

The smart device 11 includes a battery dedicated to the smart device 618. The smart device 11 is driven by the battery 618. Note that the audio input unit 609 includes a microphone into which audio is input. The audio output unit 610 includes a speaker that outputs audio.

With the above-described hardware configuration, the smart device 11 can implement the following processes.

<Software Configuration>
<<Intermediary Device>>

Figure 4:
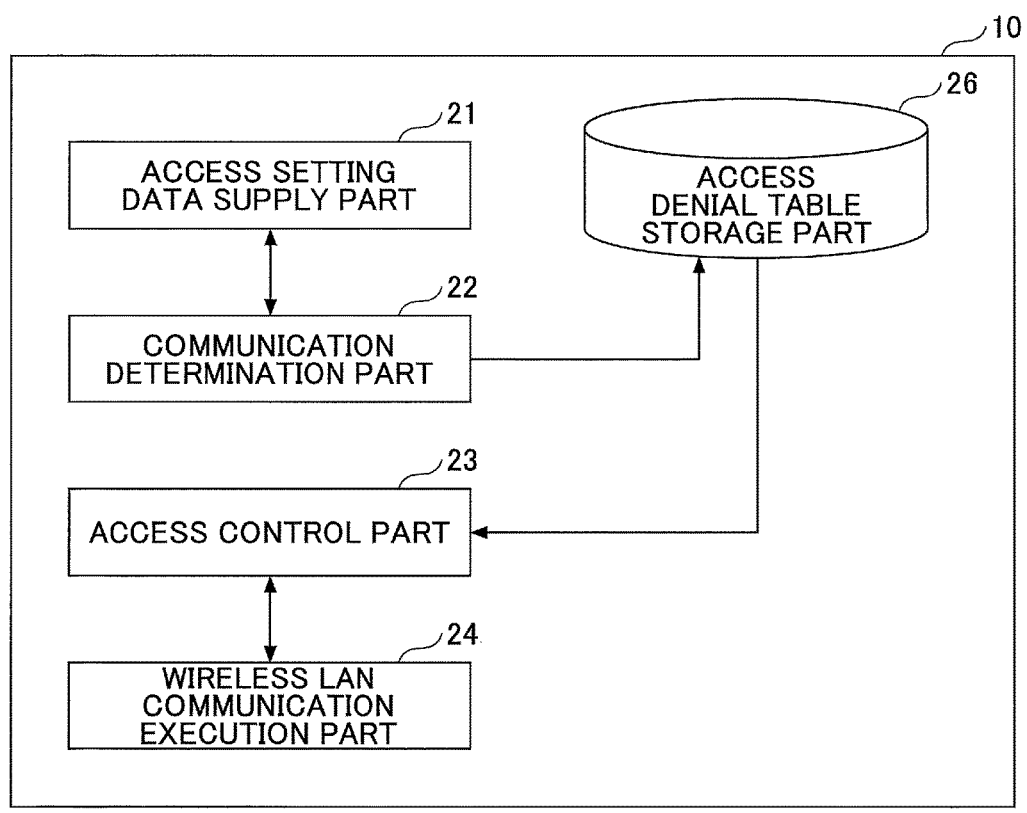
FIG. 4 is a functional block diagram of an intermediary device according to an embodiment of the present invention.

The intermediary device 10 according to an embodiment of the present invention is implemented by the functional blocks illustrated in FIG. 4. FIG. 4 is a functional block diagram of the intermediary device 10 according to an embodiment of the present invention. The intermediary device 10 implements an access setting data supply part 21, a communication determination part 22, an access control part 23, a wireless LAN communication execution part 24, and an access denial table storage part 26 by executing a program stored in, for example, the ROM 505 or the HDD 509.

The access setting data supply part 21 supplies access setting data to the smart device 11 by way of BLE communication. The communication determination part 22 determines whether the smart device 11 supplied with the access setting data is permitted to perform communication. Further, the communication determination part 22 stores data pertaining to the smart device 11 prohibited from accessing by wireless LAN communication in the access denial table storage part 26.

The data pertaining to the smart device 11 prohibited from accessing by wireless LAN communication includes, for example, the host name of the smart device 11, the OP address of the smart device 11, and the MAC address of the smart device 11.

The access control part 23 refers to the access denial table storage part 26 and controls the wireless LAN communication execution part 24 to deny wireless LAN communication access by the smart device 11 stored in the access denial table storage part 26. The wireless LAN communication execution part 24 performs wireless LAN communication with electronic devices such as the smart device 11 and the projector 14.

<<Smart Device>>

Figure 5:
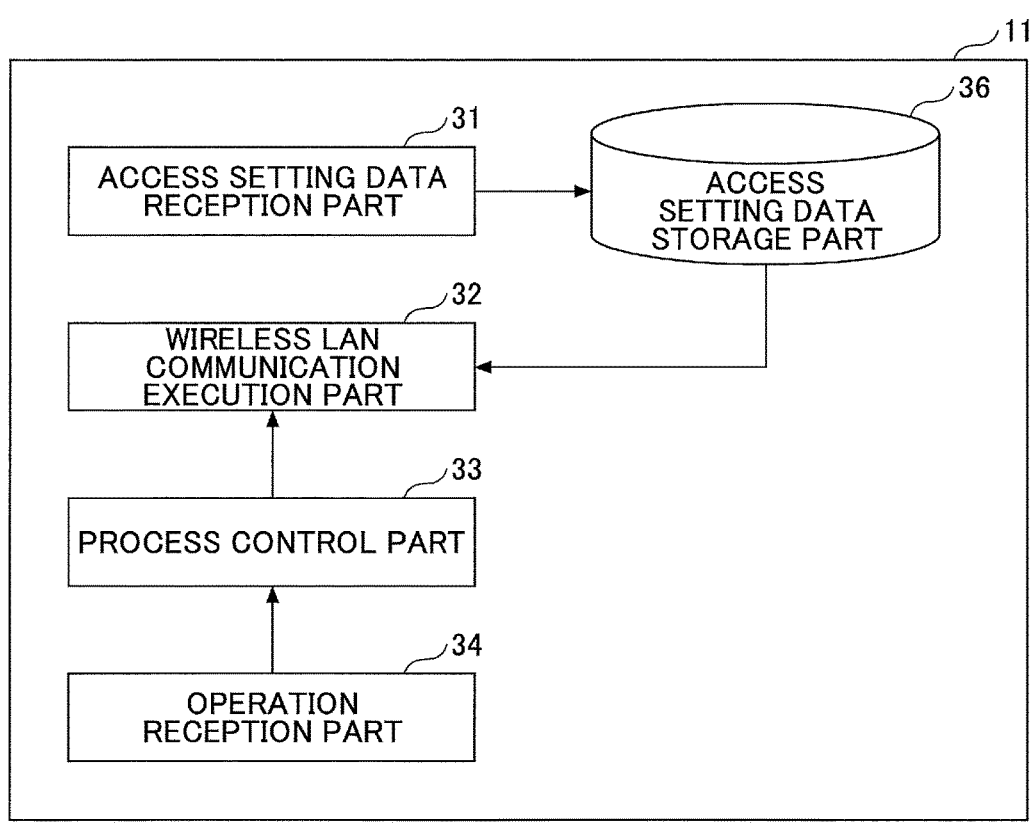
FIG. 5 is a functional block diagram of a smart device according to an embodiment of the present invention.

The smart device 11 according to an embodiment of the present invention is implemented by the functional blocks illustrated in FIG. 5. FIG. 5 is a functional block diagram of the smart device 11 according to an embodiment of the present invention. The smart device 11 implements an access setting data reception part 31, a wireless LAN communication execution 32, a process control part 33, an operation reception part 34, and an access setting data storage part 36 by executing an application stored in, for example, the ROM 602, the EEPROM 604 or the recording media 607.

The access setting data reception part 31 receives access setting data from the intermediary device 10 by way of BLE communication and stores the access setting data in the access setting data storage part 36. The wireless LAN communication execution part 32 uses the access setting data stored in the access setting data storage part 36 and performs wireless LAN communication with the intermediary device 10.

The operation reception part 34 receives operations performed by the user. The process control part 33 executes a process according to the operation performed on the operation reception part 34. When communication with an electronic device such as the MFP 12 is necessary according to the operation of the user, the process control part 33 uses the wireless LAN communication execution part 32 to perform wireless LAN communication.

<Details of Processes by Communication System>

Next, the processes performed by the communication system 1 according to an embodiment of the present invention are described in further detail.

<<Access Permission>>

Figure 6:
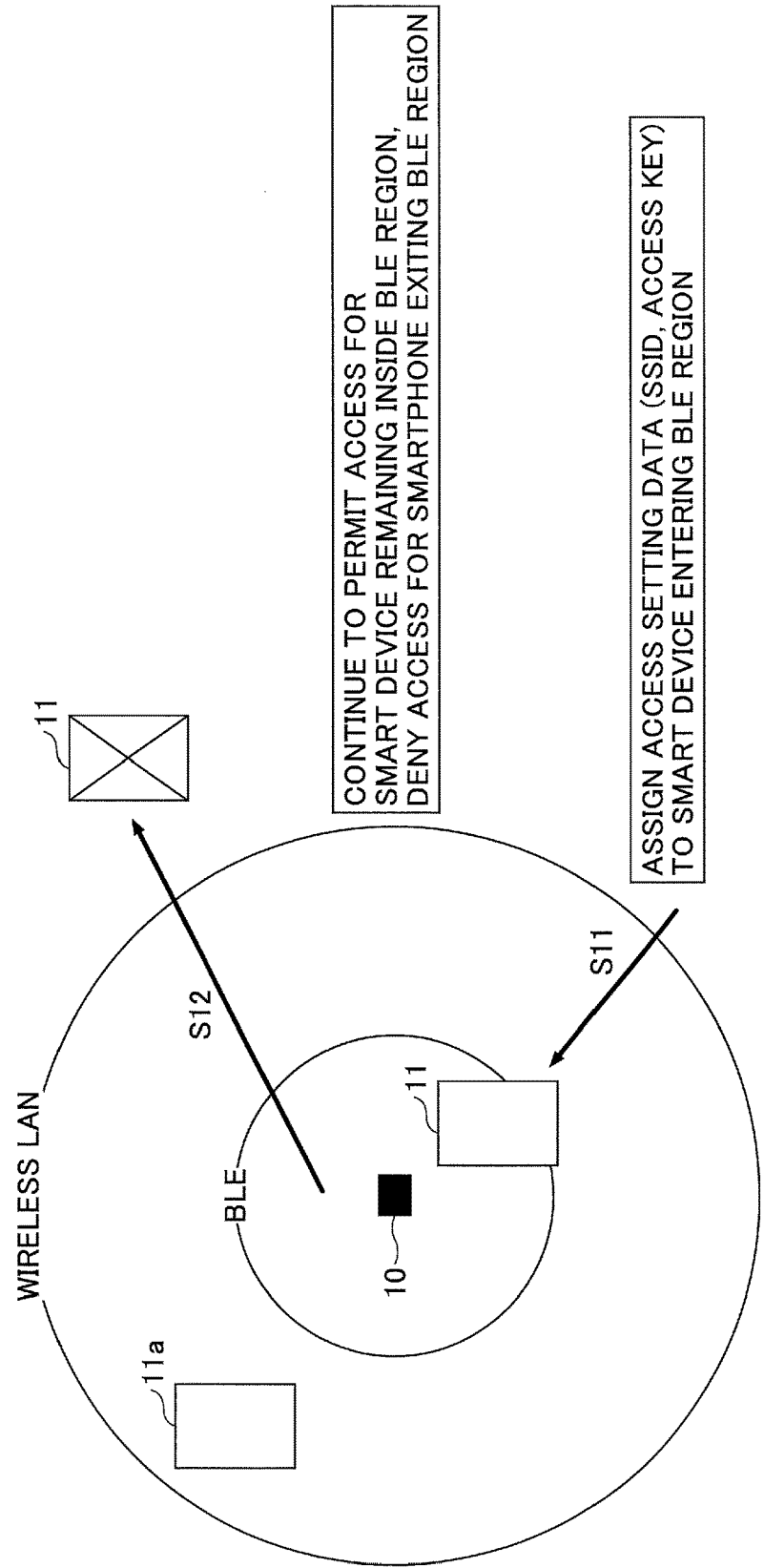
FIG. 6 illustrates an example of a procedure of permitting access according to an embodiment of the present invention.

The communication system 1 according to an embodiment of the present invention permits the smart device 11 to access the intermediary device 10 by way of wireless LAN communication. FIG. 6 illustrates an example of a procedure of permitting access.

The smart device 11 is required to obtain access setting data for performing wireless LAN communication. In Step S11, the user carrying the smart device 11 enters the BLE region. The intermediary device 10 supplies access setting data by way of BLE communication to the smart device 11 that has entered the BLE region. The smart device 11 can access the intermediary device 10 by way of wireless LAN communication by using the access setting data received from the intermediary device 10.

In Step S12, the user carrying the smart device 11 exits the wireless LAN region. The smart device 11 having exited the wireless LAN region can no longer access the intermediary device 10 by way of wireless LAN communication. Note that the smart device 11a remaining in the wireless LAN region can continue to access the intermediary device 10 by way of wireless LAN communication.

<<Problems of Communication System of Related Art>>

Figure 7:
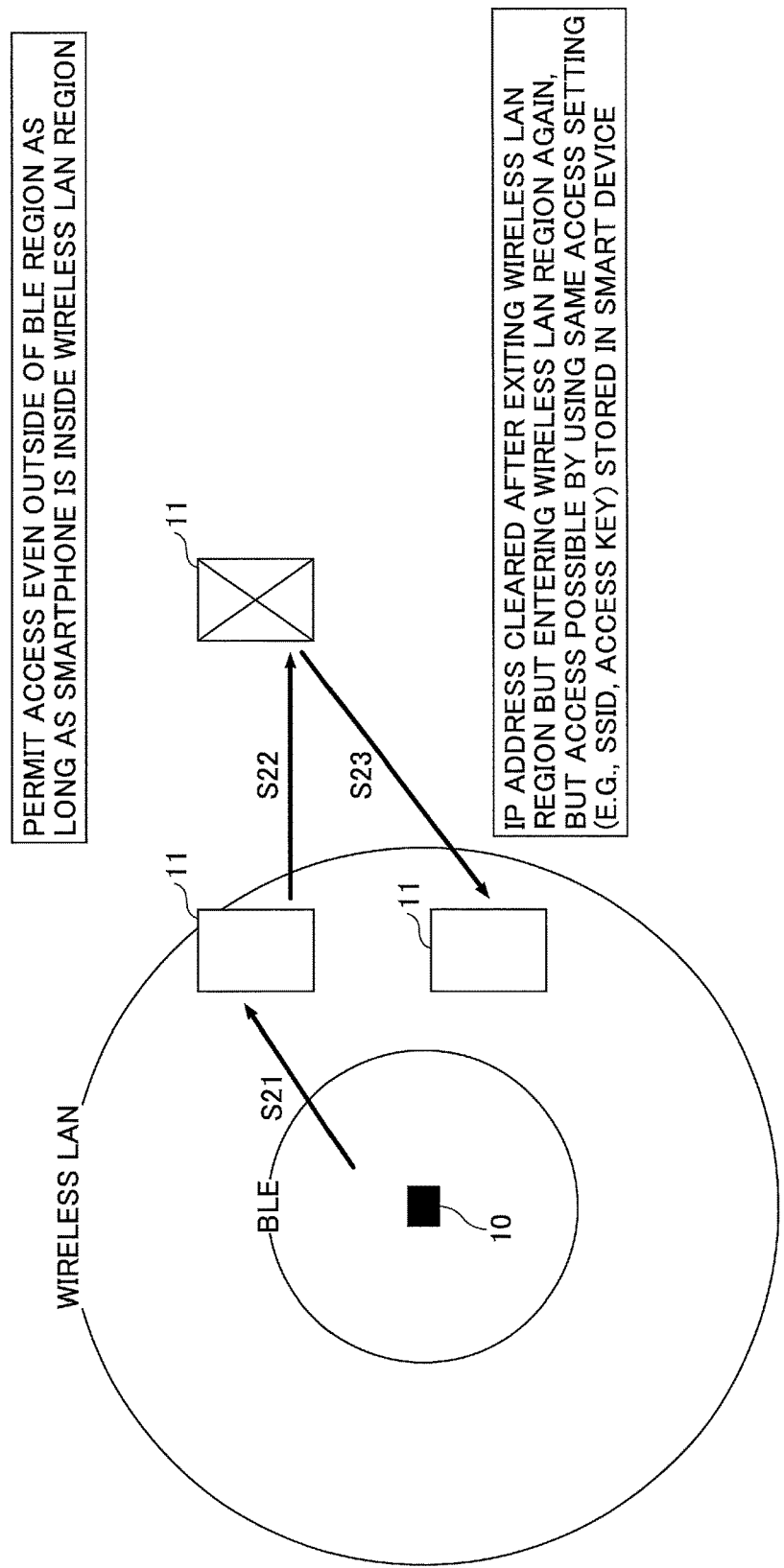
FIG. 7 is a schematic diagram depicting the problems of a communication system of a related art example.

Next, the problems of a communication system of a related art example are described. FIG. 7 is a schematic diagram depicting the problems of the communication system of the related art example. In Step S21, the user carrying the smart device 11 exits the BLE region. Because the smart device 11 of Step S21 has entered the wireless LAN region, the smart device 11 can continue to access the intermediary device 10 by way of wireless LAN communication.

In Step S22, the user carrying the smart device 11 exits the wireless LAN region. The smart device 11 having exited the wireless LAN region can no longer access the intermediary device 10 by way of wireless LAN communication.

In Step S23, the user carrying the smart device 11 reenters the wireless LAN region. The smart device 11 having reentered the wireless LAN region can again access the intermediary device 10 by way of wireless LAN communication by using the access setting data stored in the access setting data storage part 36.

Even where access to the intermediary device 10 is desired to be limited to a smart device 11 that is located in a specific area such as a conference room (inside the BLE region), the smart device 11 can access the intermediary device 10 by way of wireless LAN communication if the smart device 11 is located outside the BLE region but located inside the wireless LAN region. Further, in the communication system of FIG. 7, the smart device 11 re-entering the BLE region from outside the wireless LAN region can again access the intermediary device 10 by way of wireless LAN communication by using the access setting data received before exiting the wireless LAN region.

Therefore, in a case where, for example, a secure area is formed in a restricted area (e.g., conference room), an unexpected phenomenon may occur in which the smart device 11 can access the intermediary device 12 from outside the conference room or use a previously received access setting data to access the intermediate device 12. However, the communication system 1 of this embodiment can resolve the above-described problems by performing the following processes.

<<Access Denial>>

Figure 8:
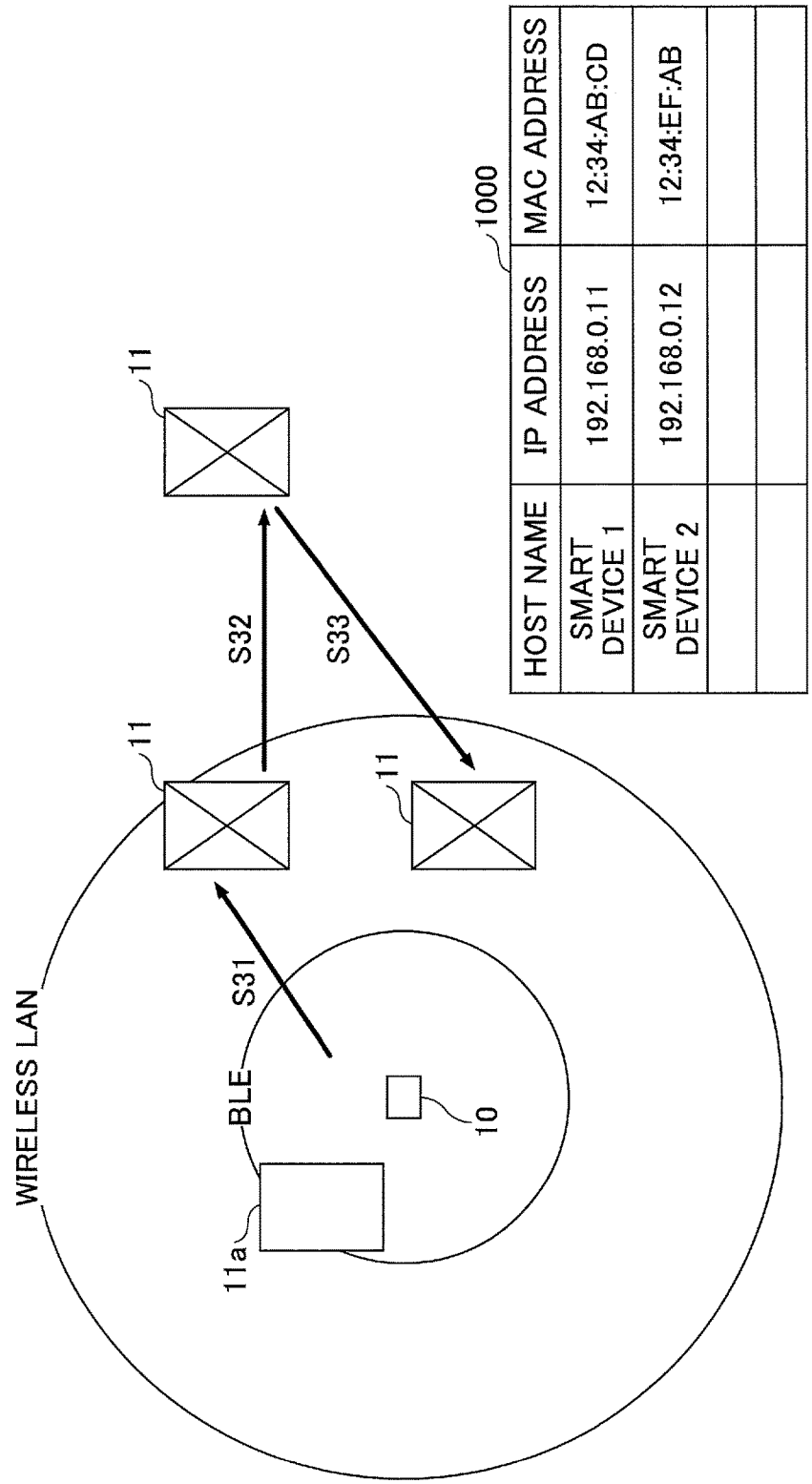
FIG. 8 is a schematic diagram depicting an example of the procedure of an access denial process according to an embodiment of the present invention.

As illustrated in FIG. 8, the communication system 1 of this embodiment prohibits the smart device 11 from accessing the intermediary device 12 by way of wireless LAN communication after the smart device 11 has exited the BLE region after establishing access authorization of wireless LAN communication. FIG. 8 is a schematic diagram depicting an example of the access denial procedure.

In Step S31, the user carrying the smart device 11 exits the BLE region. When the communication determination unit 22 of the intermediary device 10 detects the smart device 11 exiting the BLE region, the communication determination unit 22 stores the data of the detected smart device 21 in an access denial table 1000 in the access denial table storage part 26.

The access control part 23 controls the wireless LAN communication execution part 24, so that the smart device 11 listed in the access denial table 1000 of the access denial table storage part 26 is prohibited from accessing the intermediary device 10 by way of wireless LAN communication. Thereby, wireless LAN communication access by the smart device 11 listed in the access denial table 1000 is denied.

In Step S32, the data of the smart device 11 that has exited the wireless LAN region remains listed in the access denial table 1000. Therefore, even if the user carrying the smart device 11 reenters the wireless LAN region, the smart device 11 is prohibited from accessing the intermediary device 10 by way of wireless LAN communication.

For example, data such as "host name", "IP address", and "MAC address" are listed in the access denial table 1000 as the data of the smart device 11 prohibited from accessing the intermediary device 10 by way of wireless LAN communication. Even if the host name or the IP address of the smart device 11 is changed, the MAC address of the smart device 11 is unchangeable. Therefore, the intermediary device 10 can continue to deny the wireless LAN communication access of the smart device 11 that has exited the BLE region. Note that the method for denying the wireless LAN communication access may be, for example, dropping all communications (transmission/reception) of the smart device 11 listed in the access denial table 1000 or handling all communications (transmission/reception) of the smart device 11 listed in the access denial table 1000 as errors.

Figure 9:
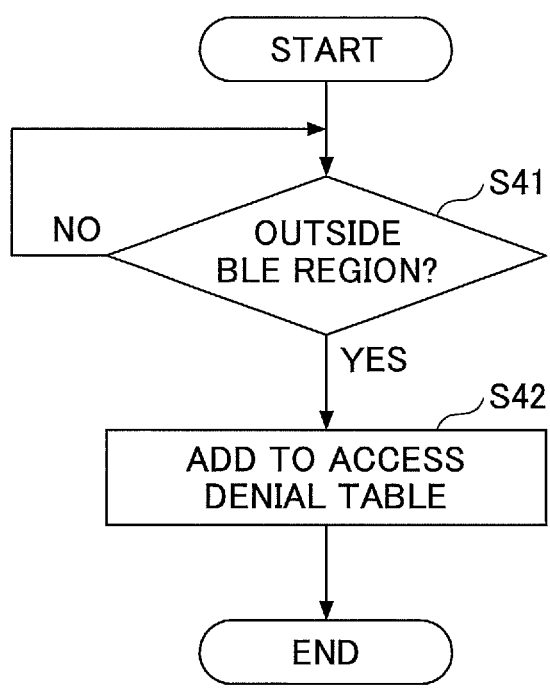
FIG. 9 is a flowchart illustrating an example of the processes performed by a communication determination part according to an embodiment of the present invention.

FIG. 9 is a flowchart illustrating an example of the processes performed by the communication determination part 22. The communication determination part 22 determines whether the smart device 11 supplied with access setting data from the access setting data supply part 21 has exited from the BLE region. The communication determination part 22 detects the smart device 11 exiting from the BLE region, for example, by using BLE communication and confirming continuity at predetermined time intervals. The confirming of continuity in Step S41 is repeated until the exit of the smart device 11 from the BLE region is detected.

The process of the communication determination part 22 proceeds from Step S41 to Step S42 when the exit from the BLE region of the smart device 11 supplied with access setting data is detected. In Step S42, the communication determination part 22 records the data of the detected smart device 11 in the access denial table 1000.

FIGS. 8 and 9 illustrate a case of prohibiting wireless LAN communication access of the smart device 11 that has exited the BLE region after access authorization of wireless LAN communication has been established. Alternatively, the intermediary device 11 may prohibit wireless LAN communication with the smart device 11 that has exited the wireless LAN region after establishing wireless LAN communication with the smart device 11 as illustrated in FIGS. 10 and 11.

Figure 10:
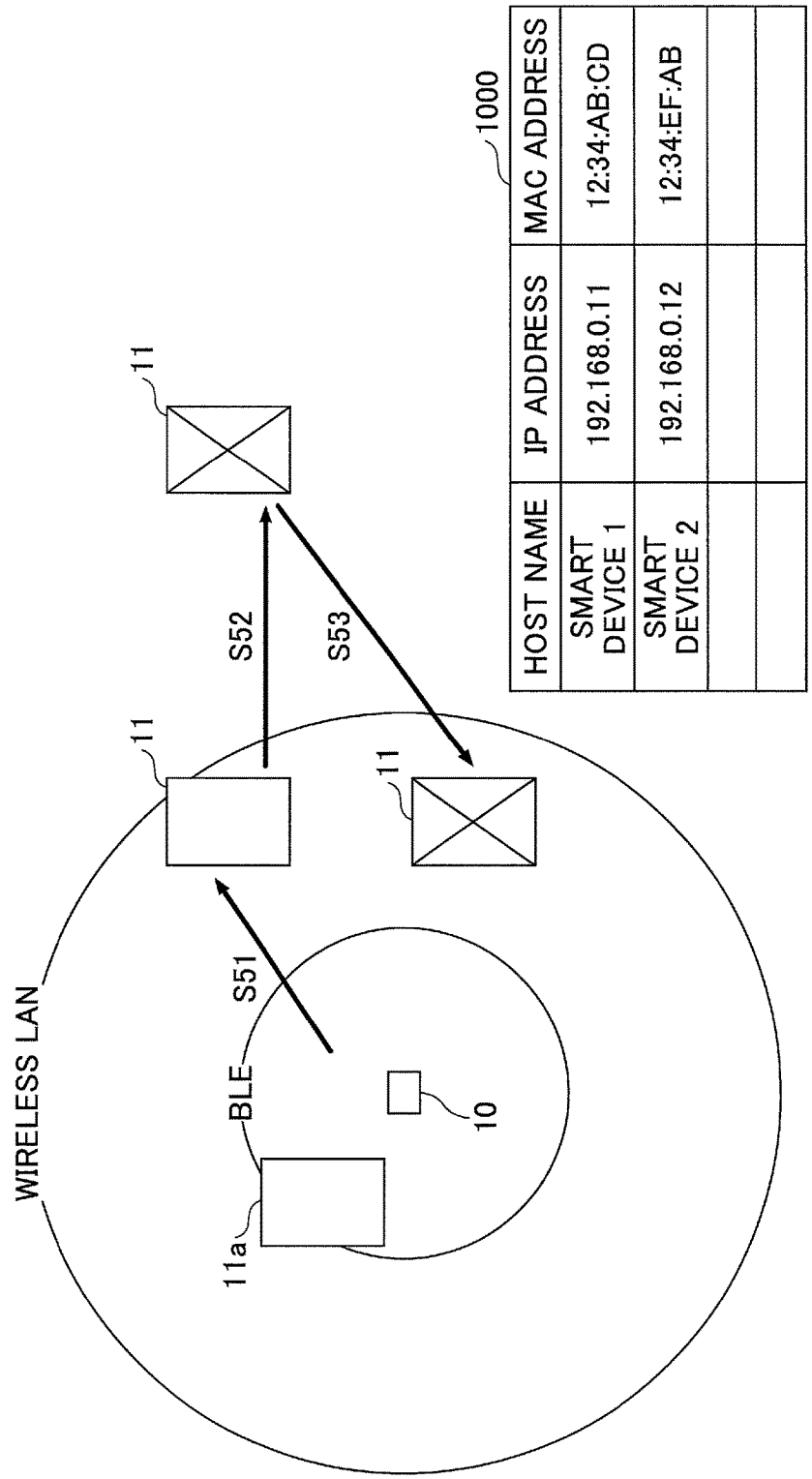
FIG. 10 is a schematic diagram depicting another example of the procedure of an access denial process according to an embodiment of the present invention.
Figure 11:
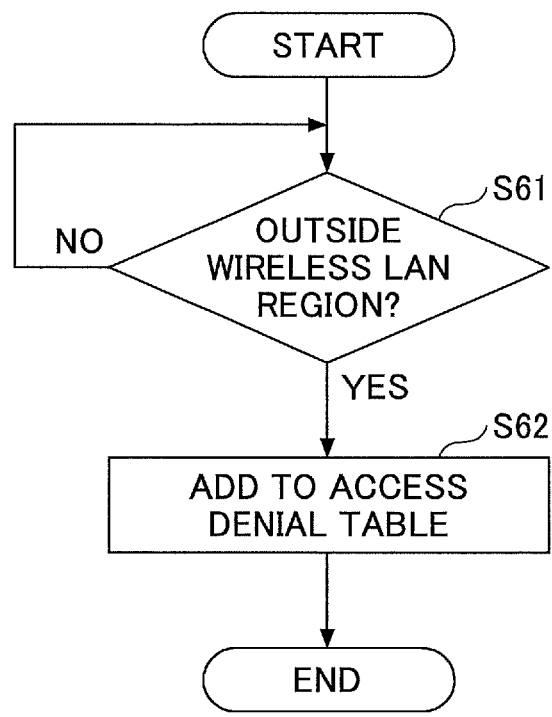
FIG. 11 is a flowchart illustrating another example of the processes performed by a communication determination part according to an embodiment of the present invention.

FIG. 10 is a schematic diagram depicting another example of the procedure of access denial. In the movement of the smart device 11 in Step S51, the smart device 11 does not exit the wireless LAN region. Therefore, the intermediary device 10 does not prohibit wireless LAN communication from the smart device 11 in Step 51. In Step S52, the user carrying the smart device 11 exits from the wireless LAN region. When the communication determination unit 22 of the intermediary device 10 detects the exit of the smart device 11 from the wireless LAN region, the communication determination unit 22 stores the data of the detected smart device 21 in the access denial table 1000 in the access denial table storage part 26.

The access control part 23 controls the wireless LAN communication execution part 24, so that the smart device 11 listed in the access denial table 1000 of the access denial table storage part 26 is prohibited from accessing the intermediary device 10 by way of wireless LAN communication. Thereby, wireless LAN communication access by the smart device 11 listed in the access denial table 1000 is denied.

In Step S52, the data of the smart device 11 that has exited the wireless LAN region remains listed in the access denial table 1000. Therefore, even if the user carrying the smart device 11 reenters the wireless LAN region, the smart device 11 is prohibited from accessing the intermediary device 10 by way of wireless LAN communication.

Similar to the access denial table 1000 of FIG. 8, the access denial table 1000 of FIG. 10 also lists data such as "host name", "IP address", and "MAC address" as the data of the smart device 11 prohibited to access the intermediary device 10 by way of wireless LAN communication. Even if the host name or the IP address of the smart device 11 is changed, the MAC address of the smart device 11 is unchangeable. Therefore, the intermediary device 10 can continue to deny the wireless LAN communication access of the smart device 11 that has exited the wireless LAN region even if the smart device 11 reenters the wireless LAN region.

FIG. 11 is a flowchart illustrating another example of the processes performed by the communication determination part 22 of the intermediary device 10. The communication determination part 22 determines whether the smart device 11 supplied with access setting data from the access setting data supply part 21 has exited from the wireless LAN region. The communication determination part 22 detects the smart device 11 exiting from the wireless LAN region, for example, by performing wireless LAN communication and confirming continuity at predetermined time intervals. The confirming of continuity in Step S61 is repeated until the exit of the smart device 11 from the wireless LAN region is detected.

The process of the communication determination part 22 proceeds from Step S61 to Step S62 when the smart device 11 being supplied with access setting data is detected exiting from the wireless LAN region. In Step S62, the communication determination part 22 records the data of the detected smart device 11 in the access denial table 1000.

FIGS. 8 to 11 illustrate embodiments of denying wireless LAN communication of the smart device 11 by using the access denial table 1000. In the following embodiment illustrated in FIGS. 12 and 13, the intermediary device 10 can deny wireless LAN communication of the smart device 11 that has exited the BLE region by updating the access setting data.

Figure 12:
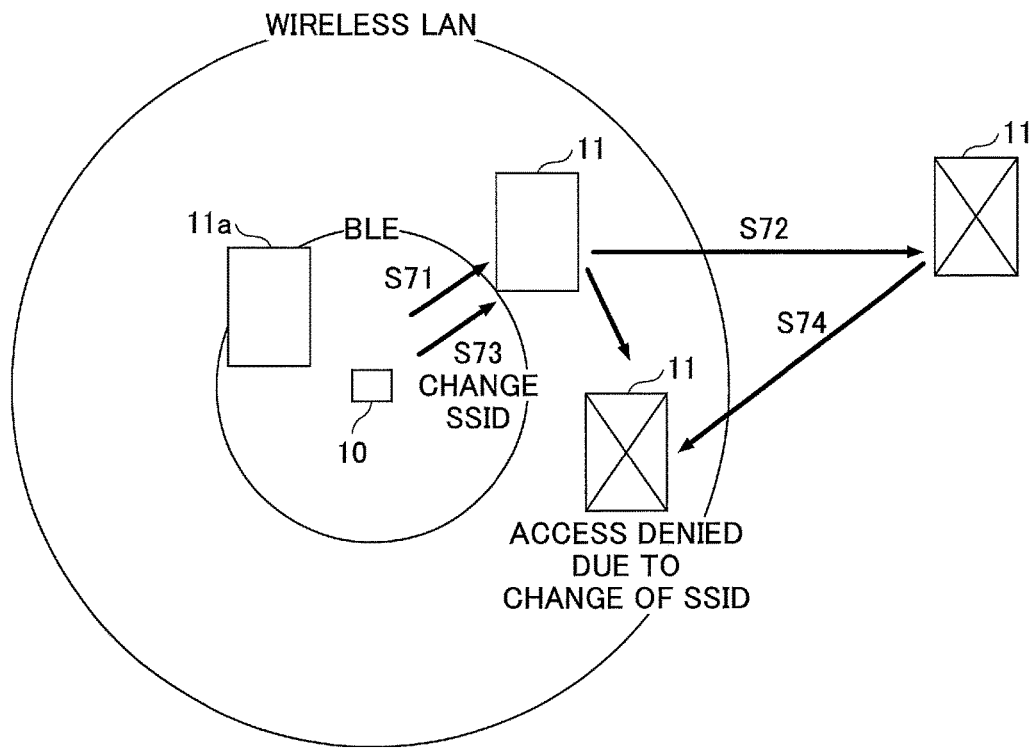
FIG. 12 is a schematic diagram depicting another example of the procedure of an access denial process according to an embodiment of the present invention.

FIG. 12 is a schematic diagram depicting another example of the procedure of access denial. In Step S71, the movement of the smart device 11 is within the wireless LAN region. That is, the smart device 11 does not exit the wireless LAN region. Therefore, the smart device 11 can access the intermediary device 10 by way of wireless LAN communication.

In Step S72, the user carrying the smart device 11 exits the wireless LAN region. Because the smart device 11 has exited the wireless LAN region, the smart device 11 cannot access the intermediary device 10 by way of wireless LAN communication.

In Step S73, the communication determination part 22 of the intermediary device 10 requests the access setting data supply part 21 to update the access setting data when the communication determination part 22 detects the exit of the smart device 11 from the BLE region. The access setting data supply part 21 changes the access setting data and supplies the changed access setting data to a smart device 11*a* located in the BLE region.

For example, the access setting data supply part 21 changes the SSID and the access key in the access setting data and supplies the changed access setting data to the smart device 11*a* located in the BLE region. Because the smart device 11*a* located in the BLE region is supplied with the changed access setting data, the smart device 11*a* can continue to access the intermediary device 10 by way of wireless LAN communication.

On the other hand, when the user carrying the smart device 11 reenters the wireless LAN region in Step S74, the smart device 11 is prohibited from accessing the intermediary device 10 by way of wireless LAN communication because the smart device 11 has not received the changed access setting data. Further, the smart device 11 that has remained in the wireless LAN region also is prohibited from accessing the intermediary device 10 because the smart device 11 has not received the changed access setting data.

Figure 13:
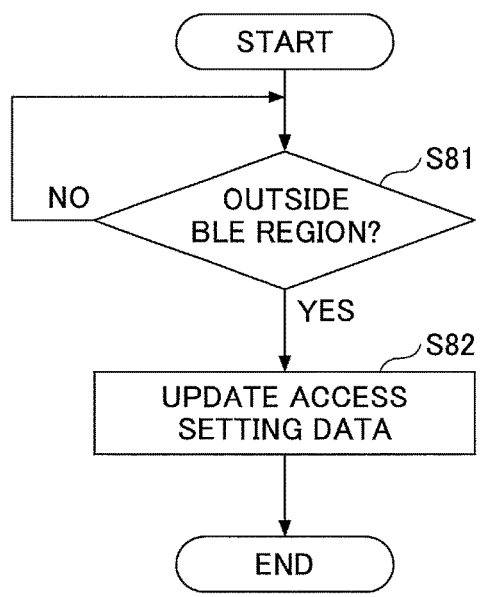
FIG. 13 is a flowchart illustrating another example of the processes performed by a communication determination part according to an embodiment of the present invention.

FIG. 13 is a flowchart illustrating another example of the processes performed by the communication determination part 22. The communication determination part 22 determines whether the smart device 11 supplied with access setting data from the access setting data supply part 21 has exited from the BLE region. The communication determination part 22 detects the exit of the smart device 11 from the BLE region, for example, by using BLE communication and confirming continuity at predetermined time intervals. The confirming of continuity in Step S81 is repeated until the exit of the smart device 11 from the BLE region is detected.

The process of the communication determination part 22 proceeds from Step S81 to Step S82 when the exit from the BLE region of the smart device 11 supplied with access setting data is detected. In Step S82, the communication determination part 22 requests the access setting data supply part 21 to update the access setting data. In response to the request from the communication determination part 22, the access setting data supply part 21 changes the access setting data and supplies the changed access setting data to the smart device 11a located in the BLE region.

As illustrated in the below-described FIG. 14, the intermediary device 10 can combine the processes of prohibiting wireless LAN communication by using the access denial table 1000 (FIGS. 8 to 11) and the processes of prohibiting wireless LAN communication by updating the access setting data.

Figure 14:
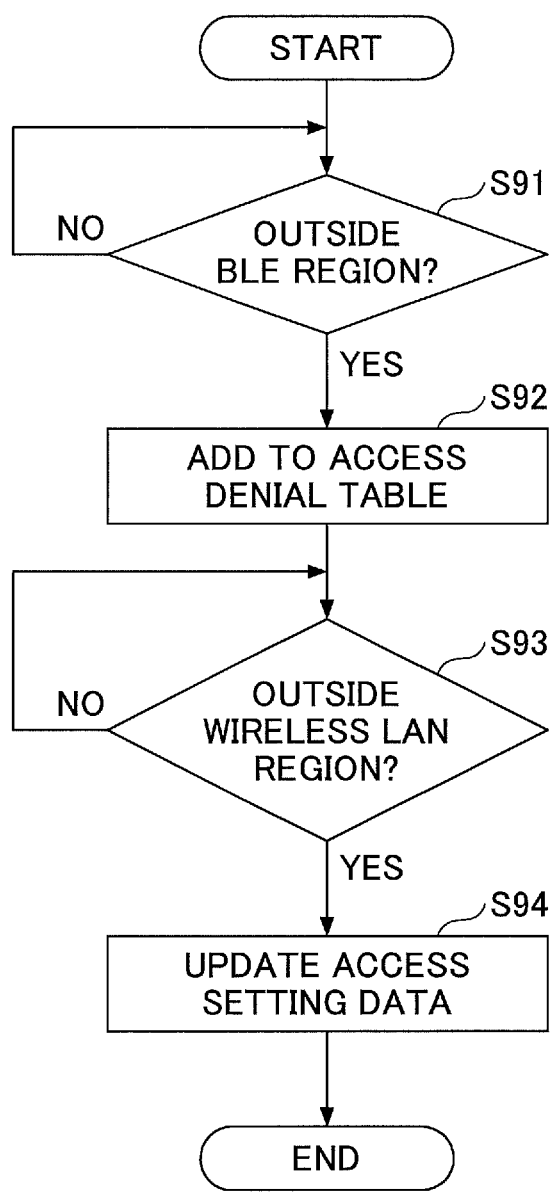
FIG. 14 is a flowchart illustrating yet another example of the processes performed by a communication determination part according to an embodiment of the present invention.

FIG. 14 is a flowchart illustrating yet another example of the processes performed by the communication determination part 22. The communication determination part 22 determines whether the smart device 11 supplied with access setting data from the access setting data supply part 21 has exited from the BLE region. The communication determination part 22 detects the exit of the smart device 11 from the BLE region, for example, by using BLE communication and confirming continuity at predetermined time intervals. The confirmation of continuity in Step S91 is repeated until the exit of the smart device 11 from the BLE region is detected.

The process of the communication determination part 22 proceeds from Step S91 to Step S92 when the exit from the BLE region of the smart device 11 supplied with access setting data is detected. In Step S92, the communication determination part 22 records the access setting data of the smart device 11 exiting the BLE region in the access denial table 1000. Thereby, the intermediary device 11 can prohibit wireless LAN communication of the smart device 11 that has exited the wireless LAN region after establishing wireless LAN communication with the smart device 11.

Further, in Step S93, the communication determination part 22 detects the smart device 11 exiting from the wireless LAN region, for example, by using wireless LAN communication and confirming continuity at predetermined time intervals. The confirmation of continuity in Step S93 is repeated until the smart device 11 exiting from the wireless LAN region is detected.

The process of the communication determination part 22 proceeds from Step S93 to Step S94 when the exit from the wireless LAN region of the smart device 11 supplied with access setting data is detected. In Step S94, the communication determination part 22 requests the access setting data supply part 21 to update the access setting data. In response to the request from the communication determination part 22, the access setting data supply part 21 changes the access setting data and supplies the changed access setting data to the smart device 11a located in the BLE region.

<<Restarting Access>>

Figure 15:
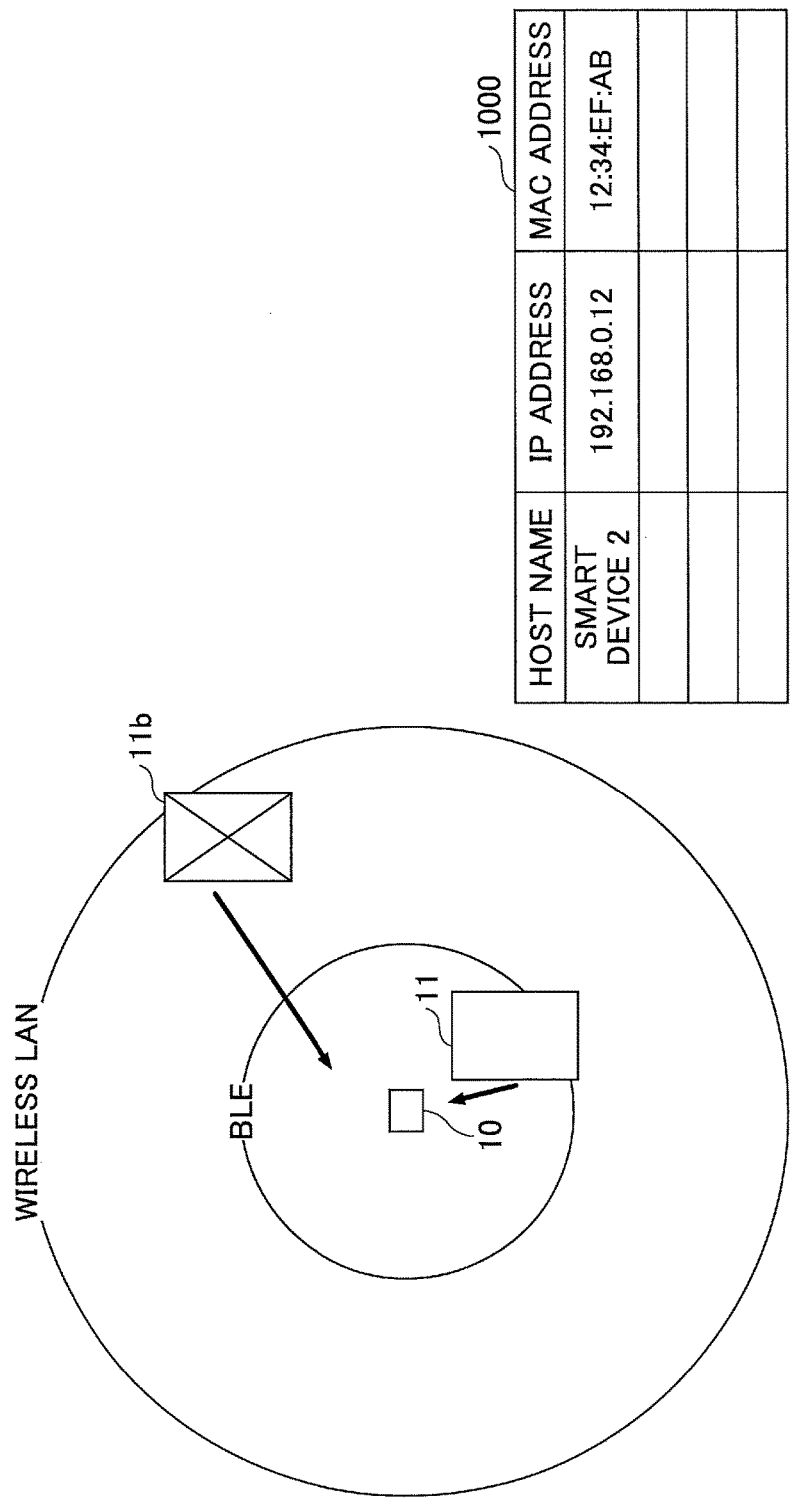
FIG. 15 is a schematic diagram depicting an example of the procedure of an access restart process according to an embodiment of the present invention.

As illustrated in the below-described FIG. 15, the communication system 1 according to an embodiment of the present invention restarts wireless LAN communication with the smart device 11 that has been prohibited to access the intermediary device 10 by way of wireless LAN communication. FIG. 15 is a schematic diagram depicting an example of the procedure of restarting access.

The intermediary device 10 reauthorizes the wireless LAN communication access of the smart device 11 that has been prohibited from accessing the intermediary device 11 by way of wireless LAN communication when the entry of the smart device 11 into the BLE region is detected. The intermediary device 10 revives the wireless LAN communication access of the smart device 11 that has entered the BLE region by erasing the data of the smart device 11 from the access denial table 1000. FIG. 15 illustrates an example of reauthorizing the wireless LAN communication access of the smart device 11 (host name "smart device 1") by deleting the data of the smart device 11 from the access denial table 1000.

Alternatively, the intermediary device 10 may revive the wireless LAN communication access of the smart device 11 that has been prohibited from accessing the intermediary device 11 by way of wireless LAN communication by supplying the changed access setting data to the smart device 11 when the re-entry of the smart device 11 into the BLE region is detected.

Accordingly, the intermediary device can resume wireless LAN communication access in correspondence with the above-described methods for denying wireless LAN communication access by using the access denial table 1000 or by updating the access setting data.

<<Temporarily Suspending Access>>

Figure 16:
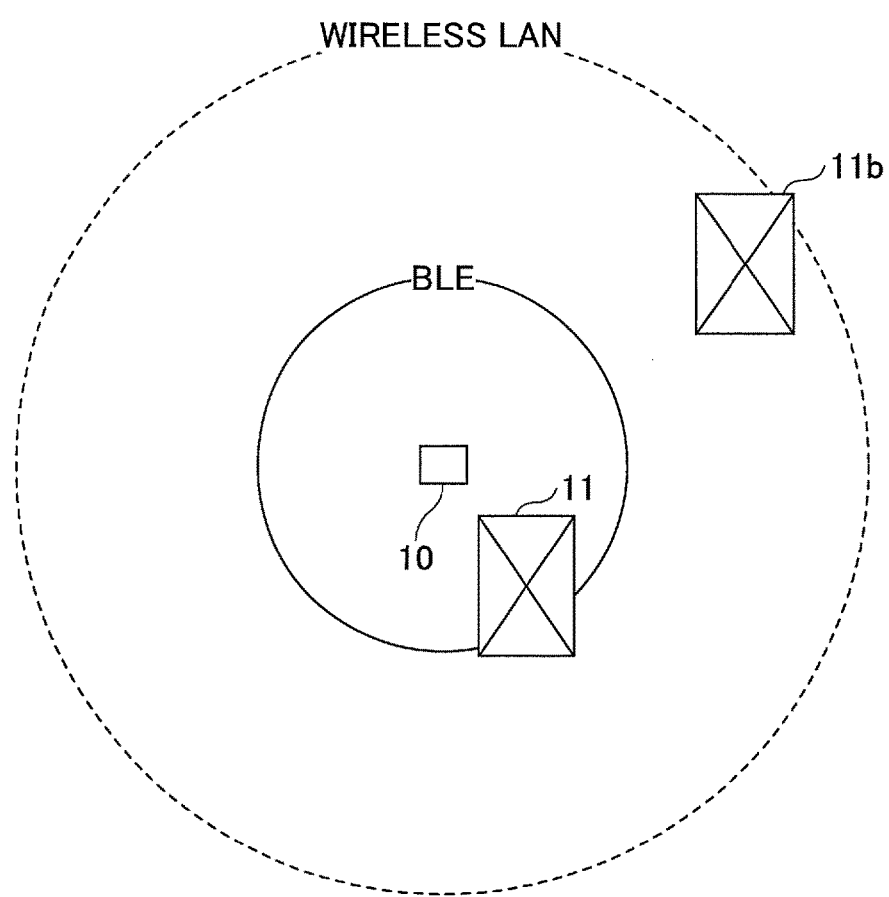
FIG. 16 is a schematic diagram depicting an example of the procedure of temporarily stopping wireless LAN communication according to an embodiment of the present invention.

In a case where wireless LAN communication is temporarily suspended, the communication system 1 according to an embodiment of the present invention may resume wireless LAN communication with a smart device 11 without having to exclude the smart device 11 or supply the smart device 11 with new access setting data at the time of resuming the temporarily suspended wireless LAN communication. FIG. 16 is a schematic diagram depicting an example of the procedure of temporarily stopping the wireless LAN communication. Note that the intermediary device 10 does not supply access setting data to the smart device 11 that has entered the BLE region during the period where the wireless LAN communication is temporarily stopped.

Alternatively, in a case where wireless LAN communication is temporarily stopped, the communication system 1 according to an embodiment of the present invention may record the data of all smart devices 11 in the access denial table 1000 and delete the data of the smart devices 11 from the access denial table at the time of resuming the temporarily stopped wireless LAN communication.

<Conclusion of First Embodiment>

Hence, the communication system 1 according to the first embodiment of the present invention can easily deny wireless LAN communication access from a smart device 11 that has exited the BLE region but located in a region capable of performing wireless LAN communication. That is, the wireless LAN communication access provided by the communication system 1 can be a limited one-time access.

[Second Embodiment]

A communication system 1A according to the second embodiment of the present invention has a removal device 15 added to the configuration of the communication system 1 of FIG. 1.

Figure 17:
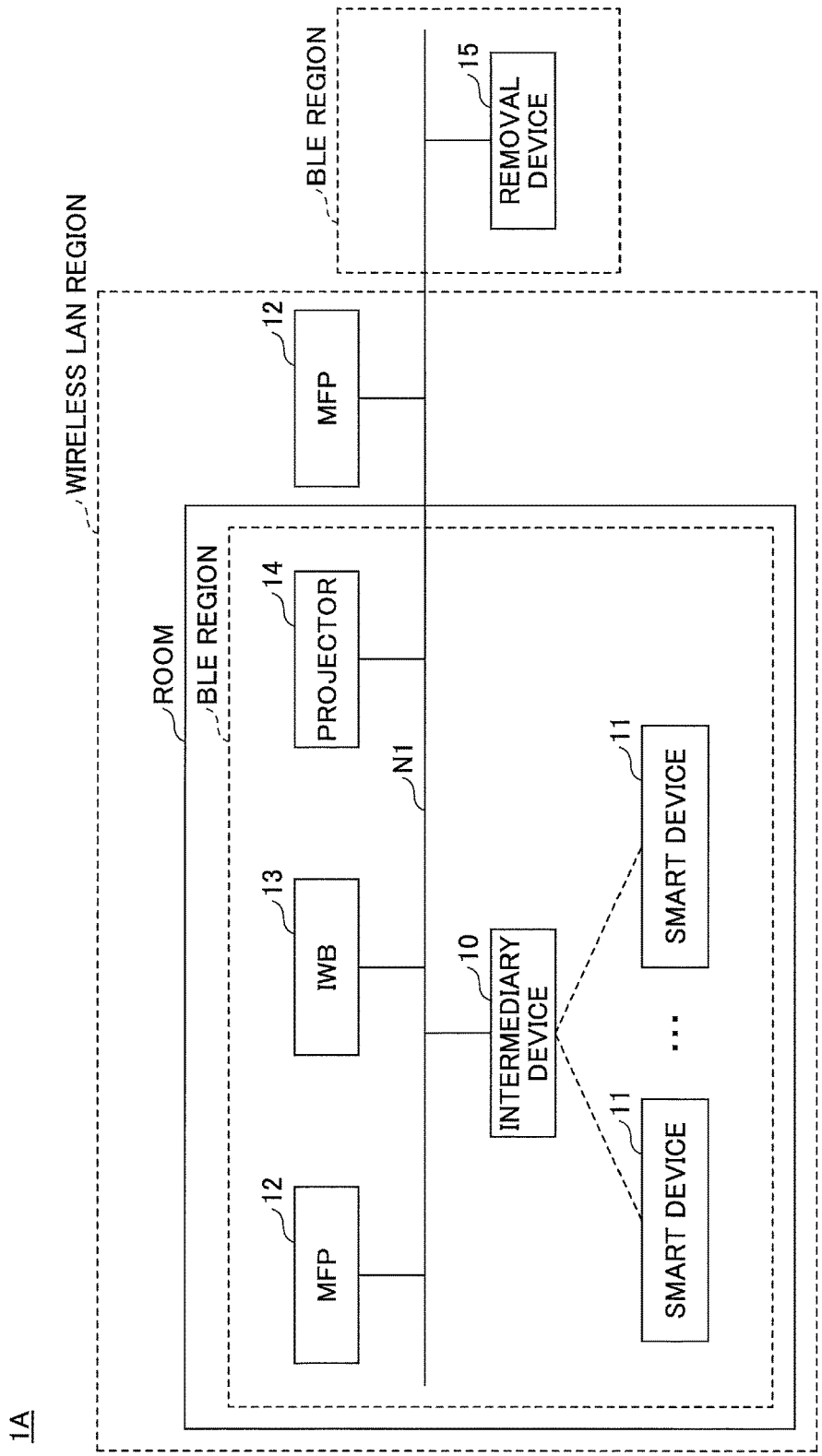
FIG. 17 is a schematic diagram illustrating a communication system according to another embodiment of the present invention.

The removal device 15 that is connected to the network N1 can access the smart device 11 by way of BLE communication. FIG. 17 is a schematic diagram illustrating the communication system 1A according to the second embodiment of the present invention.

On the right side of FIG. 17, the dotted areas indicated as "BLE region" represents an area in which the removal device 15 can communicate by way of BLE communication.

When the smart device 11 enters the BLE region of the removal device 15, the removal device 15 deletes access setting data stored in the smart device 11 and also requests the intermediary device 10 to delete the data pertaining to the smart device 11 from the access denial table 1000. When the smart device 11 enters the BLE region of one intermediary device in a case where multiple intermediary devices 10 are connected to the network N1, the one intermediary device 10 requests another intermediary device to delete the data pertaining to the smart device 11 from the access denial table 1000 of the other intermediary device 11.

By adding the removal device 15 to the communication system 1 of FIG. 1, the communication system 1A can affirmatively delete the access setting data of the smart device 11 that once could communicate by way of wireless LAN communication. Further, the communication system 1A of FIG. 17 can delete the data pertaining to the smart device 11 from the access denial table 1000 of the intermediary device 11 by using the removal device 15.

Figure 18:
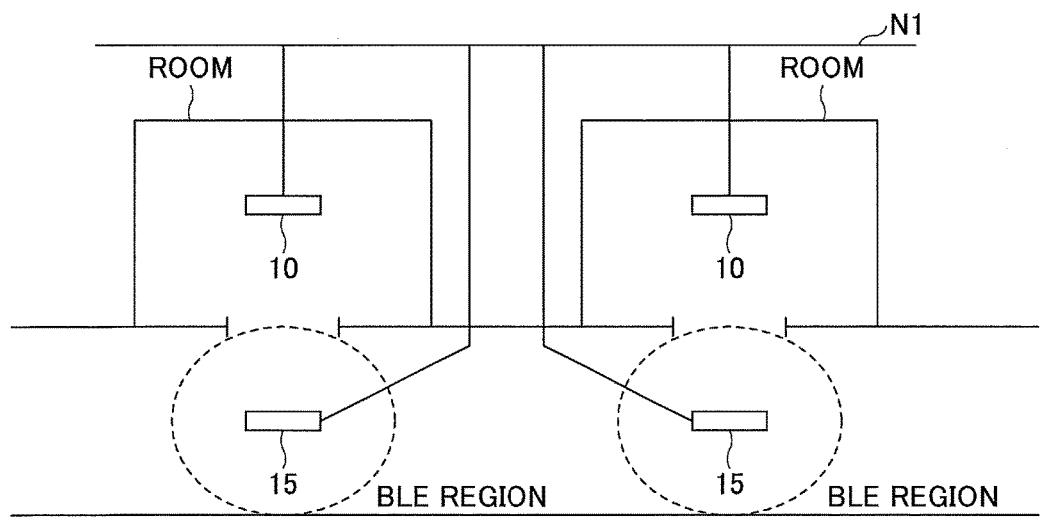
FIG. 18 is a schematic diagram illustrating an example of the placement of a removal device according to another embodiment of the present invention.

As illustrated in FIG. 18, the removal device 15 of FIG. 17 is placed in an area where the smart device 11 must always pass in order to exit the room. FIG. 18 is a schematic diagram illustrating an example of the placement of the removal device 15. The removal device 15 of FIG. 18 is placed, so that the BLE region becomes the area in which the smart device 11 must always pass in order to exit the room.

Because the user carrying the smart device 11 must pass the BLE region of the removal device 15 when the user exits the room, the access setting data stored in the smart device 11 is deleted. Further, the data of the smart device 11 carried by the user is deleted from the access denial table 1000 of the intermediary device 10 when the user exits the room.

The removal device 15 of the second embodiment may be implemented by using, for example, a hardware device having the hardware configuration illustrated in FIG. 2 without the wireless LAN I/F 507. Alternatively, the removal device 15 of the second embodiment may have the same hardware configuration as the hardware configuration illustrated in FIG. 2.

Figure 19:
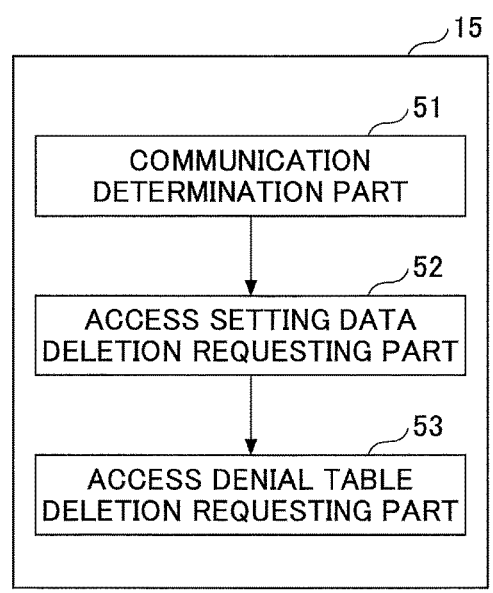
FIG. 19 is a functional block diagram of a removal device according to another embodiment of the present invention.

Further, the removal device 15 of the second is implemented by the functional blocks illustrated in FIG. 19. FIG. 19 is a functional block diagram of the removal device 15 according to the second embodiment. The removal device 15 implements a communication determination part 51, an access setting data deletion requesting part 53, and an access denial table deletion requesting part 53 by executing a program stored in, for example, the ROM 505 or the HDD 509.

The communication determination part 51 detects the smart device 11 entering the BLE region of the removal device 15 by determining whether the smart device 11 can communicate with the removal device 15 by way of BLE communication. When the smart device 11 is detected entering the BLE region, the access setting data deletion requesting part 52 requests the smart device 11 to delete the access setting data stored in the smart device 11. Further, the access denial table deletion requesting part 53 requests the intermediary device 10 to delete the data pertaining to the smart device 11 detected entering the BLE region of the removal device 15.

Figure 20:
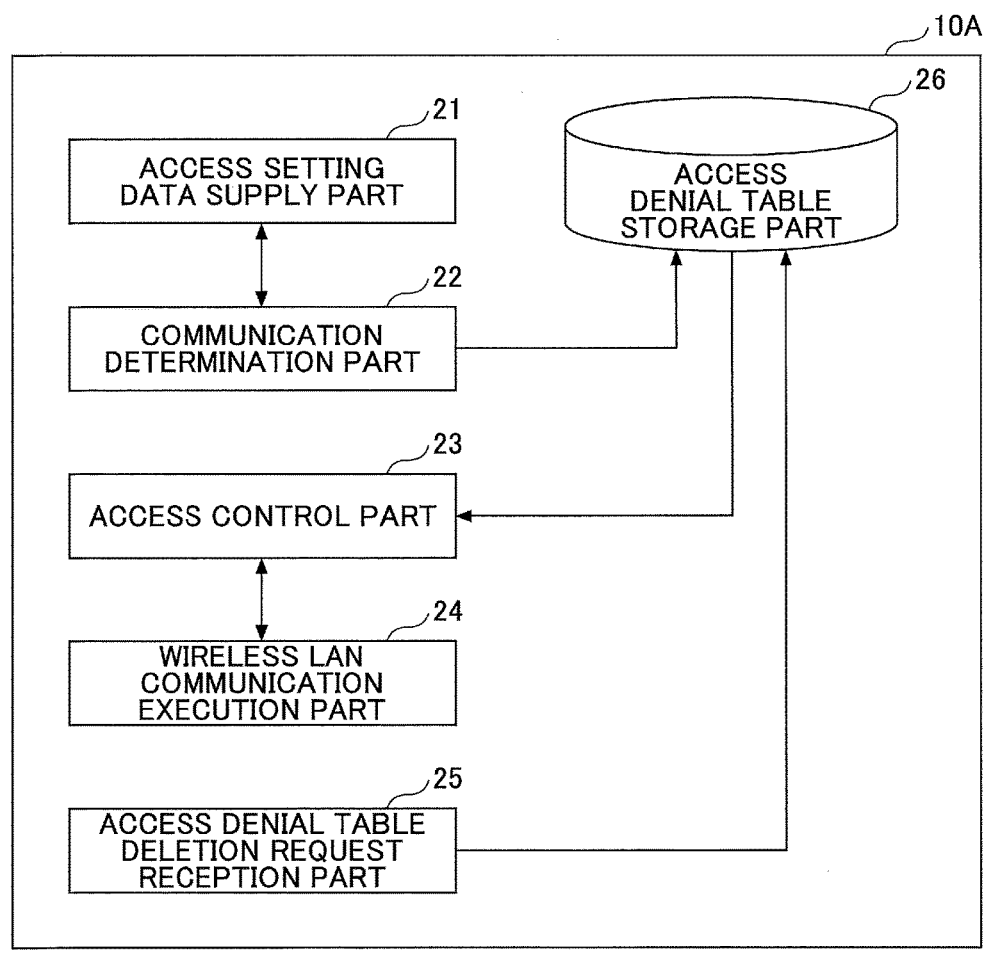
FIG. 20 is a functional block diagram of an intermediary device according to another embodiment of the present invention.
Figure 21:
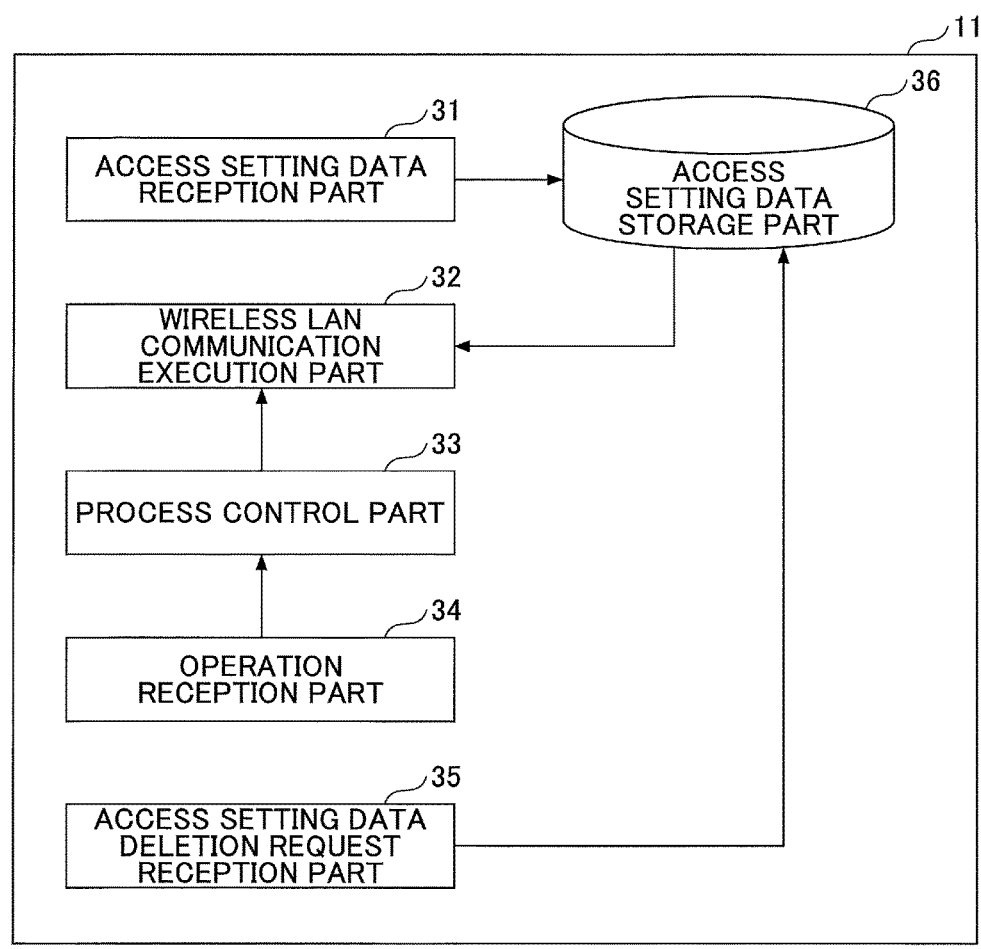
FIG. 21 is a functional block diagram of a smart device according to another embodiment of the present invention.

FIG. 20 is a functional block diagram of the intermediary device 10A according to the second embodiment of the present invention. An access denial table deletion request reception part 25 is added to the configuration of the intermediary device 10 illustrated in FIG. 4. The access denial table deletion request reception part 25 receives a request from the removal device 15 to delete the data pertaining to the smart device 11 that has entered the BLE region. In response to the request from the removal device 15, the access denial table deletion request reception part 25 deletes the data pertaining to the smart device 11 from the access denial table 1000.

Figure 24:
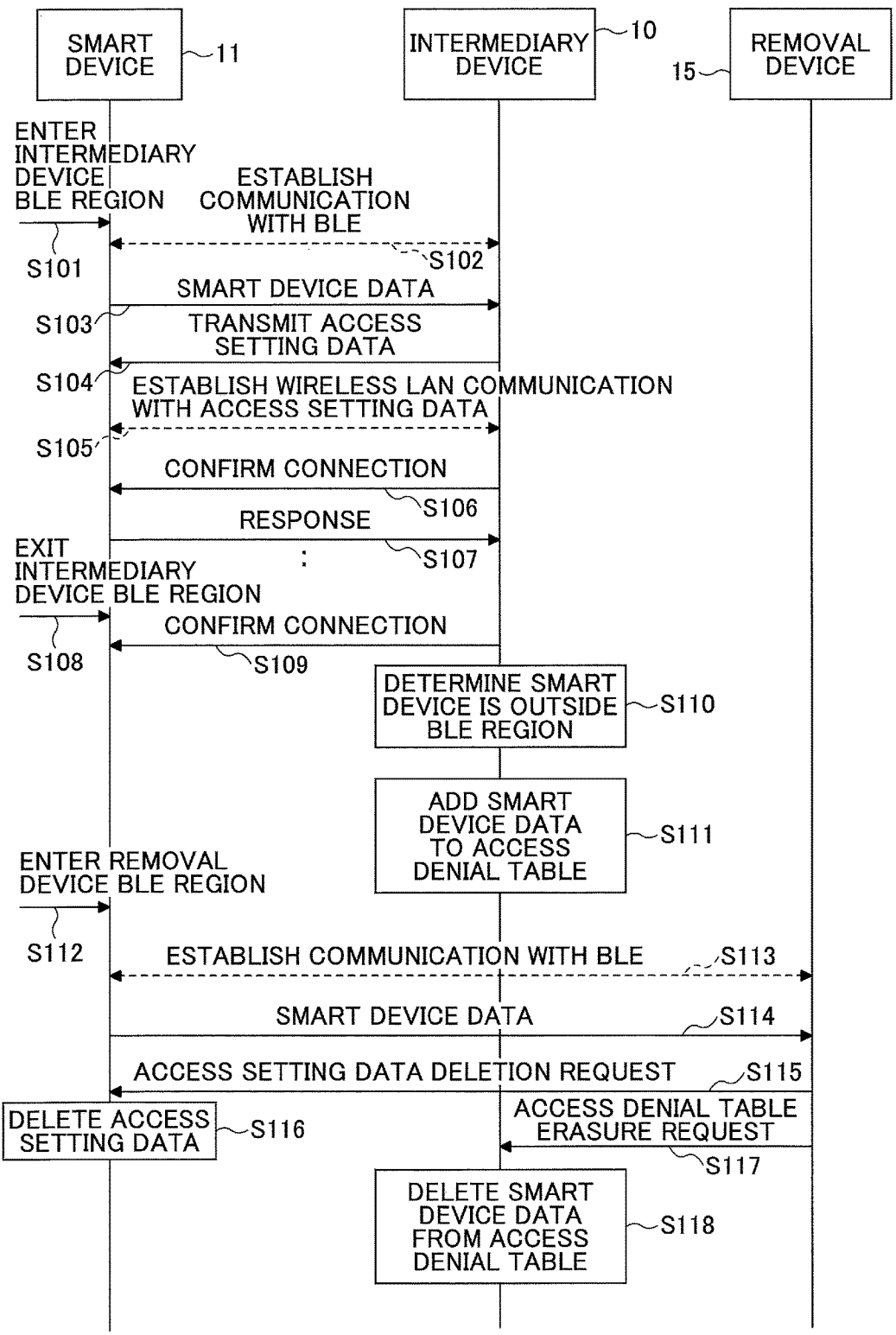
FIG. 24 is a sequence diagram illustrating an example of the procedures of a communication system according to another embodiment of the present invention.

Next, the processes performed by the smart device 11, the intermediary device 10, and the removal device 15 according to the second embodiment of the present invention are described with reference to FIG. 24. FIG. 24 is a sequence diagram illustrating an example of the procedures of the communication system 1A according to the second embodiment of the present invention. First, the smart device 11 enters the BLE region of the intermediary device 10 (Step S101) and establishes BLE communication with the intermediary device (Step S102). Then, the smart device 11 transmits data pertaining to the smart device itself 11 (e.g., MAC address) to the intermediary device 10 (Step S103). Then, the intermediary device 10 transmits access setting data to the smart device 11 (Step S104).

Note that the order for performing Step S103 and Step S104 may be switched. Further, the process of Step S103 may be omitted in a case where the intermediary device 10 can obtain data pertaining to the smart device 11 (e.g., MAC address) during wireless LAN communication described below.

Then, the smart device 11 establishes wireless LAN communication with the intermediary device 10 by using the access setting data received from the intermediary device 10 (Step S105). Further, the intermediary device 10 performs detection to determine whether the smart device 11 is located in the BLE communication region. The intermediary device 10 can determine whether the smart device 11 is located in the BLE communication region by using, for example, detection method 1 or detection method 2 described below. In this embodiment, the smart device 11 is assumed to be detected in the BLE communication region by using detection method 1.

<Detection Method 1>

The intermediary device 10 periodically transmits a connection confirmation to the smart device 11 by way of BLE communication (Step S106). If the smart device 11 transmits a response to the intermediary device 10 by way of BLE communication, the intermediary device 10 determines that the smart device 11 is in the BLE communication region (Step S107). If there is no response to the connection confirmation transmitted to the smart device 11 for a predetermined period, the intermediary device 10 determines that the smart device 11 has exited the BLE region (Steps S108 to S110).

<Detection Method 2>

The smart device 11 determines whether the smart device 11 can connect with the intermediary device 10 by way of BLE communication. The smart device 11 periodically transmits the determination result to the intermediary device 10 by way of BLE communication or wireless LAN communication. If the determination result transmitted from the smart device 11 indicates that BLE connection is possible, the intermediary device 10 determines that the smart device 11 is in the BLE region. If the determination result transmitted from the smart device 11 indicates that BLE connection is not possible, the intermediary device 10 determines that the smart device 11 has exited the BLE region.

Then, the intermediary device 10 adds the data pertaining to the smart device 11 to the access denial table 1000 when the intermediary device 10 determines that the smart device 11 has exited the BLE region (Step S111).

Next, when the smart device 11 enters the BLE region of the removal device 15 (Step S112), the smart device 11 and the removal device 15 perform the above-described processes performed in Step S102 and Step 5103 (Steps S113 and S114). Then, the removal device 15 transmits a request to the smart device 11 requesting that the smart device 11 delete the access setting data used for performing wireless LAN communication with the intermediary device 10 (Step S115). Then, the smart device 11 deletes the access setting data in accordance with the request transmitted from the removal device 15 (Step S116).

Further, the removal device 15 transmits a request to the intermediary device 10 requesting that the intermediary device 10 delete the data pertaining to the smart device 11 from the access denial table (Step S117). Then, the intermediary device 10 selects (identifies) the data of the smart device 11 to be deleted from the access denial table and deletes the selected data of the smart device 11 (Step S118).

After the smart device 11 has deleted the access setting data, the smart device 11 may transmit a notification to notify the removal device 15 that the access setting data has been deleted. Then, upon receiving the notification from the smart device 11, the removal device 15 may transmit a request to the intermediary device 10 requesting that the intermediary device 10 delete the data pertaining to the smart device 11 from the access denial table. By performing these additional processes, deletion of the data pertaining to the smart device 11 from the access denial table when the access setting data has not yet been deleted from the smart device 11.

Similar to the first embodiment, the intermediary device 10 may change the access setting data when the smart device 11 establishes BLE communication with the removal device 15. When BLE communication between the smart device 11 and the removal device 15 is established, the removal device 15 is preferred to transmit a request to the intermediary device 10 requesting that the intermediary device 10 change the access setting data.

In order to perform the processes of FIG. 24, the BLE communication area of the intermediary device (i.e., the room in which the intermediary device 10 is located as illustrated in FIG. 18) and the BLE communication area of the removal device 15 are provided in different locations.

<Conclusion of Second Embodiment>

Hence, the communication system 1A according to the second embodiment of the present invention can delete the access setting data by detecting the smart device 11 entering the BLE region of the removal device 15 even if the smart device 11 that has exited the BLE region but remains located in a region capable of performing wireless LAN communication. Further, with the communication system 1A according to the second embodiment of the present invention, the data pertaining to the smart device 11 that has entered the BLE region of the removal device 15 can be deleted from the access denial table 1000.

<Other Embodiments>

Although the intermediary device 10 of the above-described embodiments supplies the access setting data by way of BLE communication, the intermediary device 10 may supply the access setting data by using other communication methods. For example, the intermediary device 10 may not only supply the access setting data by way of NFC (Near Field Communication) but may also supply the access setting data by way of infrared communication in which a QR code (registered trademark) is read by a camera and transmitted by an infrared signal.

Figure 22:
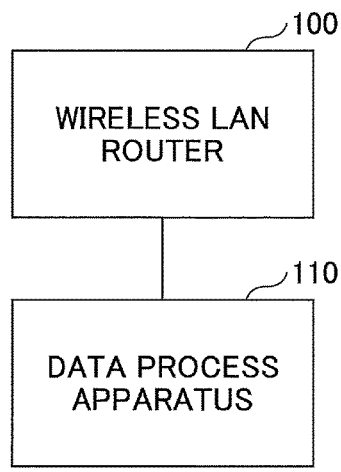
FIG. 22 is a schematic diagram illustrating a configuration of an intermediary device according to another embodiment of the present invention.

Further, the intermediary device 10 may be implemented by using separate multiple devices. For example, the intermediary device 10 may be implemented by a wireless LAN router 100 and a data process apparatus 110 as illustrated in FIG. 22. The wireless LAN router 100 performs processes related to wireless LAN communication. The data process apparatus 110 performs processes related to the supplying of access setting data and management of the access denial table 1000. Note that the processes related to BLE communication may be performed by the wireless LAN router 100 or the data process apparatus 110.

Figure 25:
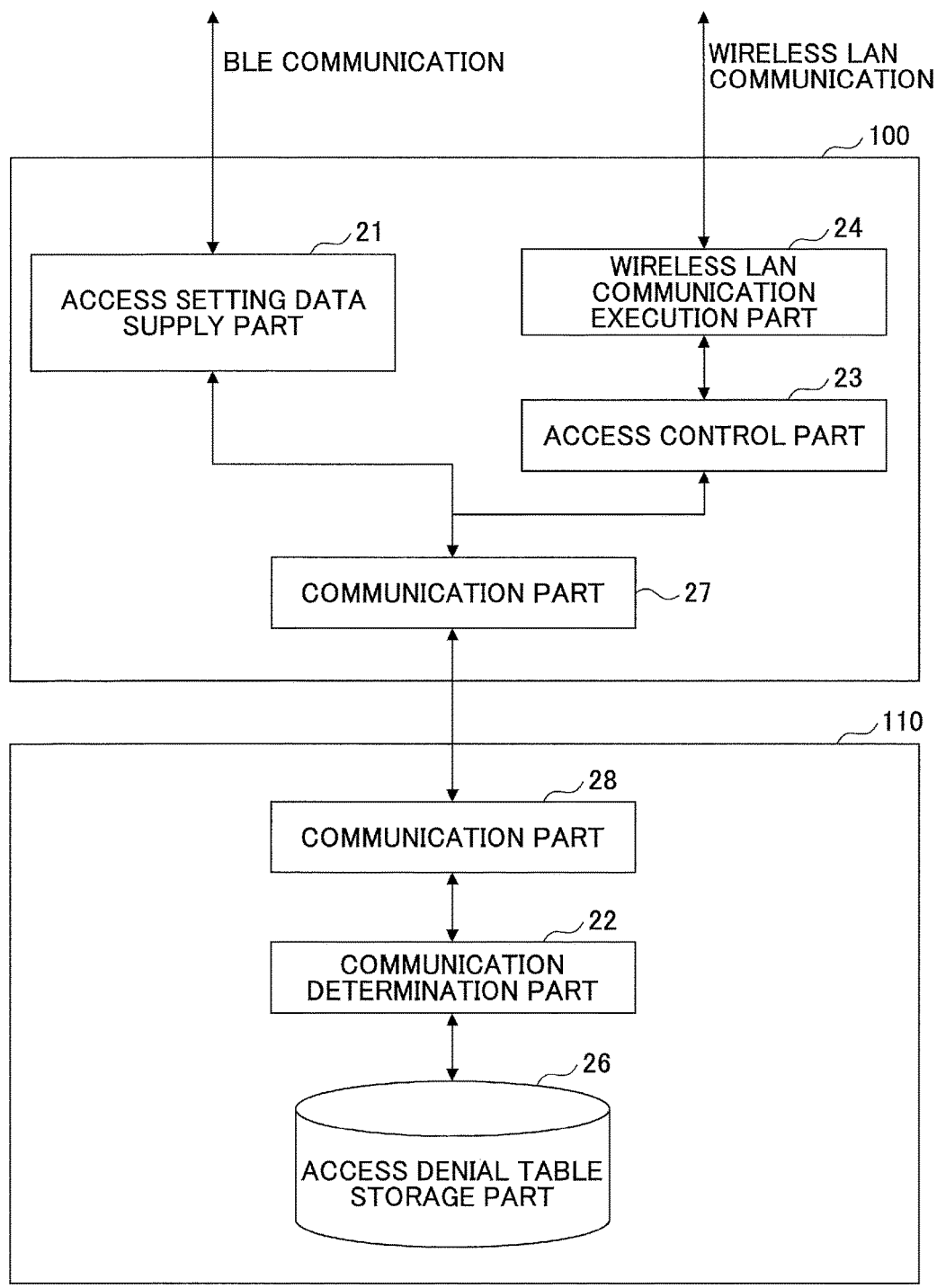
FIG. 25 is a functional block diagram of a wireless LAN router and a data process apparatus according to another embodiment of the present invention.

FIG. 25 is a functional block diagram of the wireless LAN router 100 and the data process apparatus 110 according to an embodiment of the present invention. In the embodiment of FIG. 25, the wireless LAN router 100 performs BLE communication and wireless LAN communication. A communication part 27 included in the wireless LAN router 100 communicates with the data process apparatus 110, and a communication part 28 included in the data process apparatus 110 communicates with the wireless LAN router 100. Other than the communication part 27 of the wireless LAN router 100 and the communication part 28 of the data process apparatus 110, the functions of the blocks constituting the wireless LAN router 100 and the data process apparatus 110 are the same as the functions of the blocks illustrated in FIG. 4. The communication part 27 of the wireless LAN router 100 and the communication part 28 of the data process apparatus 110 may communicate with each other by way of, for example, the network N1, wireless LAN communication, or BLE communication. Further, the communication part 27 of the wireless LAN router 100 and the communication part 28 of the data process apparatus 110 may be directly connected to each other by using a USB terminal or an interface such as IEEE 1394.

Figure 26:
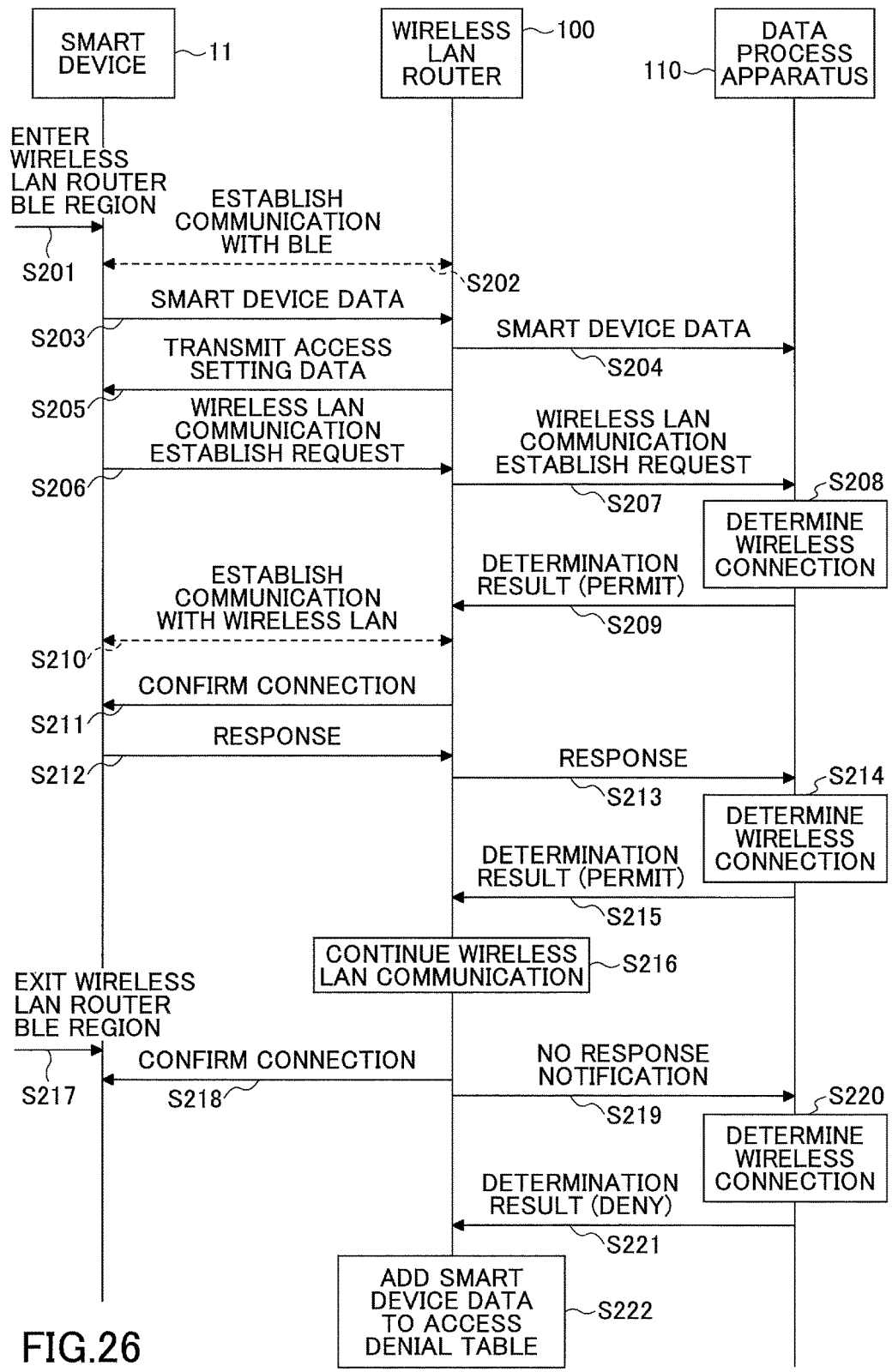
FIG. 26 is a sequence diagram illustrating an example of the procedures of a communication system according to another embodiment of the present invention.

Next, the processes performed by the smart device 11, the intermediary device 10, and the removal device 15 according to an embodiment of the present invention are described with reference to FIG. 26. When the smart device 11 enters the BLE region of the wireless LAN router 100 (Step S201), BLE communication between the smart device 11 and the wireless LAN router 100 is established (Step S202). Then, the smart device 11 transmits data pertaining to the smart device itself 11 (e.g., MAC address) to the wireless LAN router 100 (Step S203). The wireless LAN router 100 transmits the data received from the smart device 11 to the data process apparatus 110 (Step S204). Then, the wireless LAN router 100 transmits access setting data to the smart device 11 (Step S205).

Then, the smart device 11 uses the access setting data received from the wireless LAN router 100 and transmits a wireless LAN communication establish request to the wireless LAN router 100 requesting the wireless LAN router to establish wireless LAN communication with the smart device 11 (Step S206). The wireless LAN communication establish request preferably includes data pertaining to the smart device 11 (e.g., MAC address). The wireless LAN router 100 transmits an inquiry to the data process apparatus 110 inquiring the data process apparatus 110 whether the smart device 11 that has transmitted the wireless LAN communication establish request is permitted to establish wireless LAN communication with the wireless LAN router 100 (Step S207). When making the inquiry to the data process apparatus 110, the inquiry is preferred to include the data pertaining to the smart device 11.

In response to the inquiry, the data process apparatus 110 determines whether the wireless LAN router 100 is permitted to establish wireless LAN communication with the smart device 11 (Step S208). For example, in this embodiment, the data process apparatus 110 determines whether the transmitted data pertaining to the smart device 11 (transmitted data of Step S204) corresponds to the transmitted data pertaining to the smart device 11 (transmitted data of Step S207). In a case where the transmitted data of Step S204 and the transmitted data of Step S207 correspond to each other, the data process apparatus 110 determines that the smart device 11 is permitted to establish wireless LAN communication with the wireless LAN router 100. That is, the data process apparatus 110 determines whether the MAC address transmitted to the wireless LAN router 100 by way of BLE communication matches the MAC address included in the wireless LAN communication establish request.

Then, the data process apparatus 110 transmits the determination result to the wireless LAN router (Step S209). If the determination result indicates that wireless LAN communication with the smart device 11 is permitted, the wireless LAN router 100 establishes wireless LAN communication with the smart device 11 (Step S210). If the determination result indicates that wireless LAN communication with the smart device 11 is prohibited, the wireless LAN router 100 does not establish wireless LAN communication with the smart device 11. In a case where the wireless LAN communication is not established, the wireless LAN router 100 may transmit an error notice to the smart device 11 indicating that wireless LAN communication cannot be established.

When wireless LAN communication is established, the wireless LAN router 100 periodically determines whether the smart device 11 is in the BLE communication region. In this embodiment, the smart device 11 is assumed to be detected in the BLE communication region by using the above-described detection method 1 of the second embodiment.

Accordingly, the wireless LAN router 100 transmits a connection confirmation to the smart device 11 by way of BLE communication (Step S211). In response to the connection confirmation, the smart device 11 transmits a response to the wireless LAN router 100 (Step S212). The wireless LAN router 100 transmits the response received from the smart device 11 to the data process apparatus 110 (Step 213). The data process apparatus 110 determines whether to continue wireless LAN communication with the smart device 11 according to the response (Step S214). Then, the data process apparatus 110 transmits the determination result to the wireless LAN router 100 (Step S215). In the determination of Step S214, the data process apparatus 110 determines whether a response from the smart device 11 is transmitted within a predetermined period. If the response is transmitted within the predetermined period, the data process apparatus 110 determines that wireless LAN communication with the smart device 11 is to be continued. Note that the response transmitted from the wireless LAN router 100 in Step S213 may be different from the response transmitted from the smart device 11. That is, the wireless LAN router 100 may generate data indicating that "a response has been transmitted from the smart device 11" and transmit the generated data as a response to the data process apparatus 110.

If the determination result indicates that wireless LAN communication with the smart device 11 is permitted, the wireless LAN router 100 continues wireless LAN communication with the smart device 11 (Step S216). Note that the processes performed in Steps S211 to S216 are to be periodically repeated during the period where the wireless LAN communication between the smart device 11 and the wireless LAN router 100 is continued.

When the smart device 11 exits the BLE communication region of the wireless LAN router 100 (Step S217), the smart device 11 no longer transmits a response in response to the connection confirmation transmitted from the wireless LAN router 100 (Step S218). Accordingly, in a case where the wireless LAN router 100 receives no response from the smart device 11 for a predetermined period, the wireless LAN router 100 transmits a notice indicating that "no response has been transmitted from the smart device 11" to the data process apparatus 110 (Step S219).

When the data process apparatus 110 receives the notice indicating that "no response has been transmitted from the smart device 11", the data process apparatus 110 determines to discontinue (deny) the wireless LAN communication with the smart device 11 (Step S220) and transmits the determination result to the wireless LAN router 100 (S221). Note that the process of transmitting the notice from the wireless LAN router 100 to the data process apparatus 110 may be omitted. For example, in a case where no response is transmitted from the wireless LAN router 100 within a predetermined period, the data process apparatus 110 may determine that the wireless LAN communication with the smart device 11 is to be discontinued and transmit the determination result to the wireless LAN router 100.

When the determination result indicates that wireless LAN transmission with the smart device 11 is denied, the wireless LAN router 100 adds the data pertaining to the smart device 11 to the access denial table 1000 (Step S222). Because multiple smart devices 11 are anticipated to be connected to the wireless LAN router 100, it is preferable for the data transmitted/received in the processes of Steps S211 to S221 are preferred to include data enabling each of the smart devices 11 to be identified (e.g., MAC address).

Figure 23:
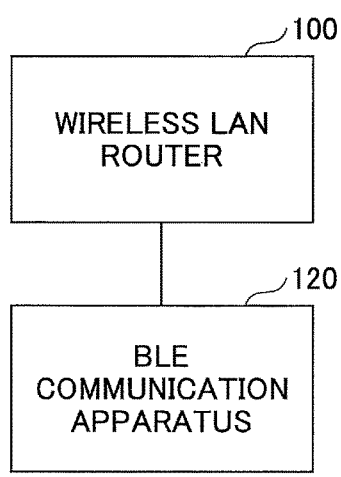
FIG. 23 is a schematic diagram illustrating a configuration of an intermediary device according to yet another embodiment of the present invention.

In another embodiment of the present invention, the intermediary device 10 may be implemented by the wireless LAN router 100 and a BLE communication apparatus 120 as illustrated in FIG. 23. The wireless LAN router 100 performs processes related to wireless LAN communication. The BLE communication apparatus 120 performs processes related to BLE communication. The processes related to the supplying of access setting data and management of the access denial table 1000 may be performed by the wireless LAN router 100 or the BLE communication apparatus 120.

Figure 27:
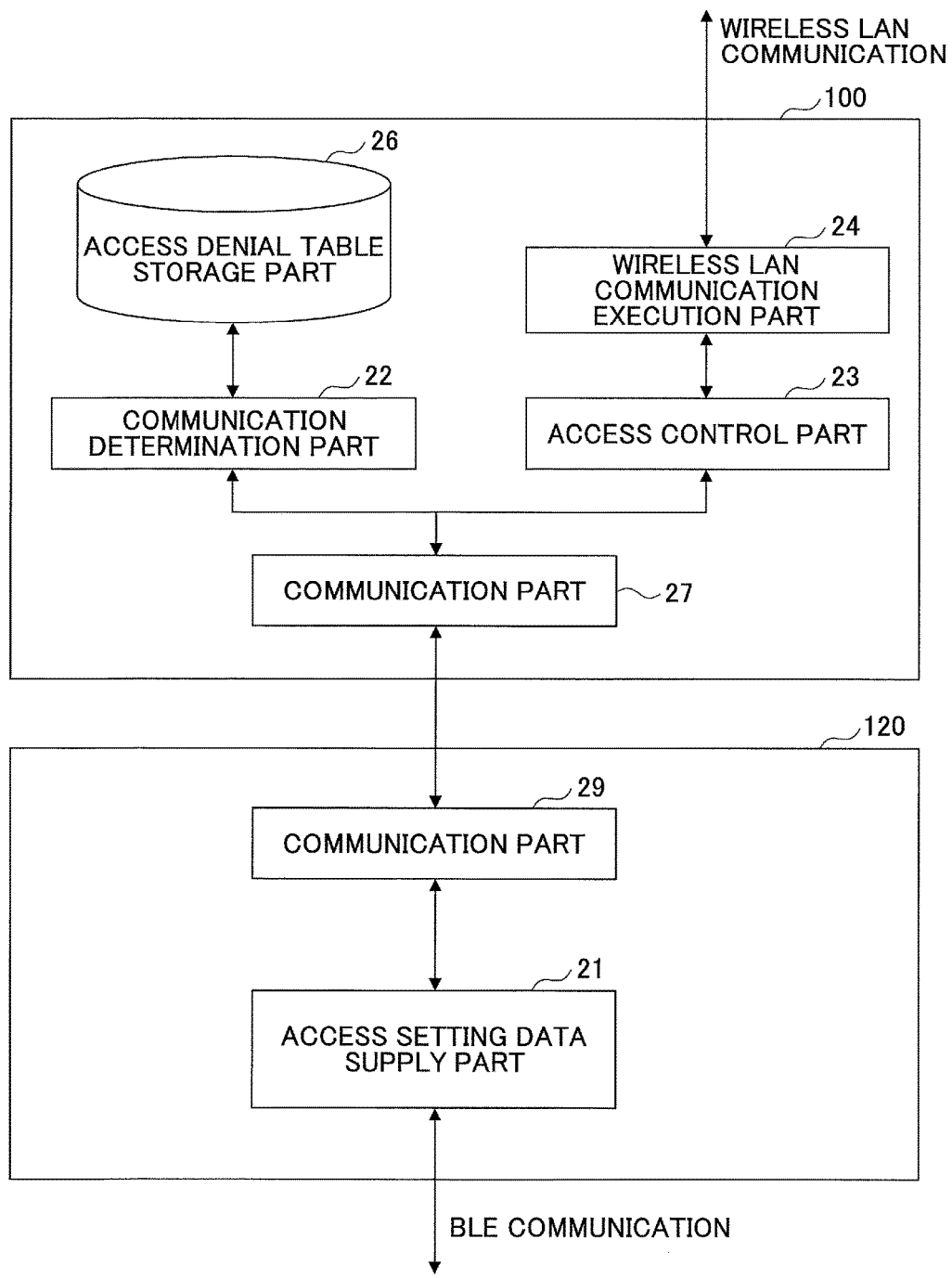
FIG. 27 is a functional block diagram of a wireless LAN router and a BLE communication apparatus according to another embodiment of the present invention.

FIG. 27 is a functional block diagram of the wireless LAN router 100 and the BLE communication apparatus 120 according to an embodiment of the present invention. Other than a communication part 29 included in the BLE communication apparatus 120 and the communication part 27 included in the wireless LAN router 100, the functions of the blocks constituting the wireless LAN router 100 and the BLE communication apparatus 120 are the same as the functions of the blocks illustrated in FIG. 4. The communication part 29 of the BLE communication apparatus 120 communicates with the wireless LAN router 100. The communication part 27 of the wireless LAN router 100 communicates with the BLE communication apparatus 120.

The communication part 27 of the wireless LAN router 100 and the communication part 29 of the BLE communication apparatus 120 may communicate with each other by way of, for example, the network N1, wireless. LAN communication, or BLE communication. Further, the communication part 27 of the wireless LAN router 100 and the communication part 29 of the BLE communication apparatus 120 may be directly connected to each other by using a USB terminal or an interface such as IEEE 1394.

Figure 28:
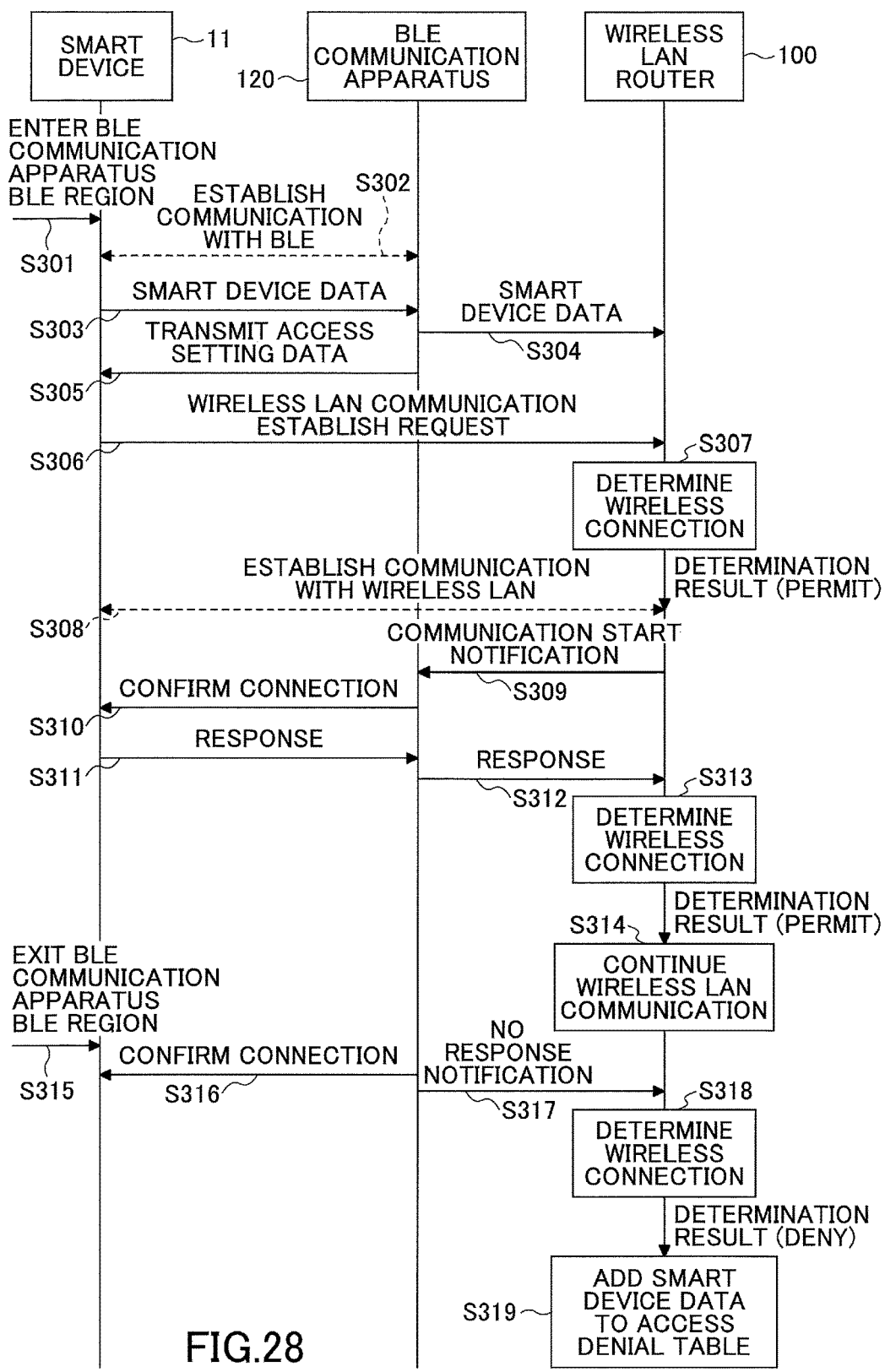
FIG. 28 is a sequence diagram illustrating an example of the procedures of a communication system according to another embodiment of the present invention.

Next, the processes performed by the BLE communication apparatus 120 and the wireless LAN router 100 according to an embodiment of the present invention are described with reference to FIG. 28. When the smart device 11 enters the BLE region of the BLE communication apparatus 120 (Step S301), BLE communication between the smart device 11 and the BLE communication apparatus 120 is established (Step S302). Then, the smart device 11 transmits data pertaining to the smart device itself 11 (e.g., MAC address) to the BLE communication apparatus 120 (Step S303). The BLE communication apparatus 120 transmits the data received from the smart device 11 to the wireless LAN router 100 (Step S304). Then, the BLE communication apparatus 120 transmits access setting data to the smart device 11 (Step S305).

Then, the smart device 11 uses the access setting data received from the BLE communication apparatus 120 and transmits a wireless LAN communication establish request to the wireless LAN router 100 requesting the wireless LAN router to establish wireless LAN communication with the smart device 11 (Step S306). The wireless LAN communication establish request is preferred to include data pertaining to the smart device 11 (e.g., MAC address). The wireless LAN router 100 determines whether the BLE communication apparatus 120 is permitted to establish wireless LAN communication with the smart device 11 (Step S307). For example, in this embodiment, the wireless LAN router 100 determines whether the transmitted data pertaining to the smart device 11 (transmitted data of Step S304) corresponds to the transmitted data pertaining to the smart device 11 (transmitted data of Step S306). In a case where the transmitted data of Step S304 corresponds to the transmitted data of Stewaer, the wireless LAN router 100 determines that the smart device 11 is permitted to establish wireless LAN communication with the wireless LAN router 100. That is, the wireless LAN router 100 determines whether the MAC address transmitted to the BLE communication apparatus 120 by way of BLE communication matches the MAC address included in the wireless LAN communication establish request.

If the determination result indicates that wireless LAN communication with the smart device 11 is permitted, the wireless LAN router 100 establishes wireless LAN communication with the smart device 11 (Step S308). If the determination result indicates that wireless LAN communication with the smart device 11 is prohibited, the wireless LAN router 100 does not establish wireless LAN communication with the smart device 11. In a case where the wireless LAN communication is not established, the wireless LAN router 100 may transmit an error notice to the smart device 11 indicating that wireless LAN communication cannot be established.

When wireless LAN communication is established, the wireless LAN router 100 transmits a notice to the BLE communication apparatus 120 indicating that wireless LAN communication with the smart device 11 has been established (start of wireless LAN communication) (Step S309). The BLE communication apparatus 120 periodically determines whether the smart device 11 is in the BLE communication region. In this embodiment, the smart device 11 is assumed to be detected in the BLE communication region by using the above-described detection method 1 of the second embodiment.

Accordingly, the BLE communication apparatus 120 transmits a connection confirmation to the smart device 11 by way of BLE communication (Step S310). In response to the connection confirmation, the smart device 11 transmits a response to the BLE communication apparatus (Step S311). The BLE communication apparatus 120 transmits the response received from the smart device 11 to the wireless LAN router 100 (Step 312). The wireless LAN router 100 determines whether to continue wireless LAN communication with the smart device 11 according to the response (Step S313). In the determination of Step S313, the wireless LAN router 100 determines whether a response from the smart device 11 is transmitted within a predetermined period. If the response is transmitted within the predetermined period, the wireless LAN router 100 determines that wireless LAN communication with the smart device 11 is to be continued. Note that the response transmitted from the BLE communication apparatus 120 in Step S312 may be different from the response transmitted from the smart device 11. That is, the BLE communication apparatus 120 may generate data indicating that "a response has been transmitted from the smart device 11" and transmit the generated data as a response to the wireless LAN router 100.

If the determination result indicates that wireless LAN communication with the smart device 11 is permitted, the wireless LAN router 100 continues wireless LAN communication with the smart device 11 (Step S314). Note that the processes performed in Steps S309 to S313 are to be periodically repeated during the period where the wireless LAN communication between the smart device 11 and the wireless LAN router 100 is continued.

When the smart device 11 exits the BLE communication region of the BLE communication apparatus (Step S315), the smart device 11 no longer transmits a response to the connection confirmation transmitted from the BLE communication apparatus 120 (Step S316). Accordingly, in a case where the wireless LAN router 100 receives no response from the smart device 11 for a predetermined period, the wireless LAN router 100 transmits a notice indicating that "no response has been transmitted from the smart device 11" to the data process apparatus 110 (Step S317).

When the wireless LAN router 100 receives the notice indicating that "no response has been transmitted from the smart device 11", the wireless LAN router 100 determines to discontinue (deny) the wireless LAN communication with the smart device 11 (Step S318). Note that the process of transmitting the notice from the BLE communication apparatus 120 to the wireless LAN router 100 may be omitted. For example, in a case where no response is transmitted from the BLE communication within a predetermined period, the wireless LAN router 100 may determine that the wireless LAN communication with the smart device 11 is to be discontinued.

When the determination result indicates that wireless LAN transmission with the smart device 11 is denied, the wireless LAN router 100 adds the data pertaining to the smart device 11 to the access denial table 1000 (Step S319). Because multiple smart devices 11 are anticipated to be connected to the wireless LAN router 100, it is preferable for the data transmitted/received in the processes of Steps S309 to S319 are preferred to include data enabling each of the smart devices 11 to be identified (e.g., MAC address).

Figure 29:
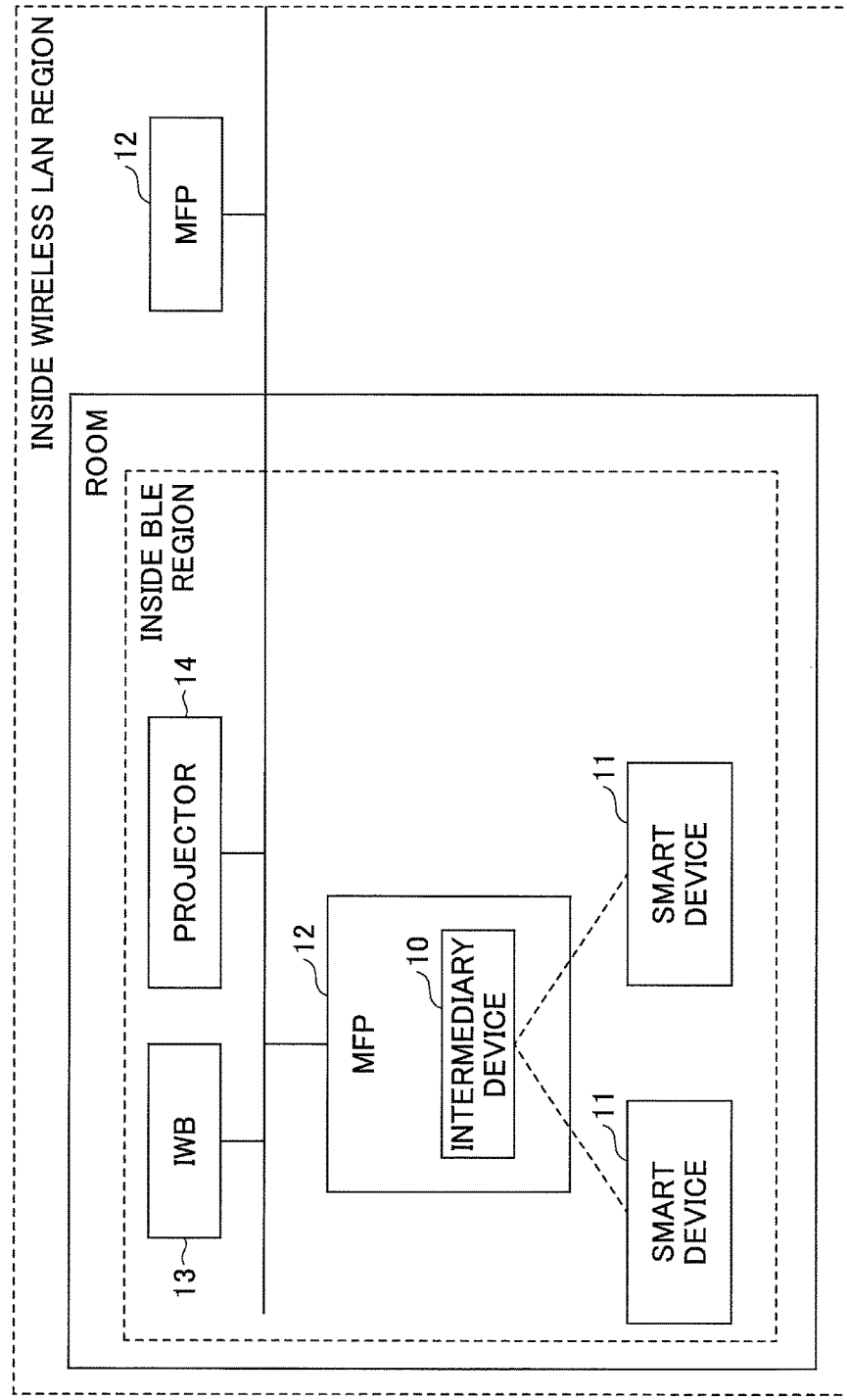
FIG. 29 is a schematic diagram illustrating an example of a communication system according to another embodiment of the present invention.
Figure 30:
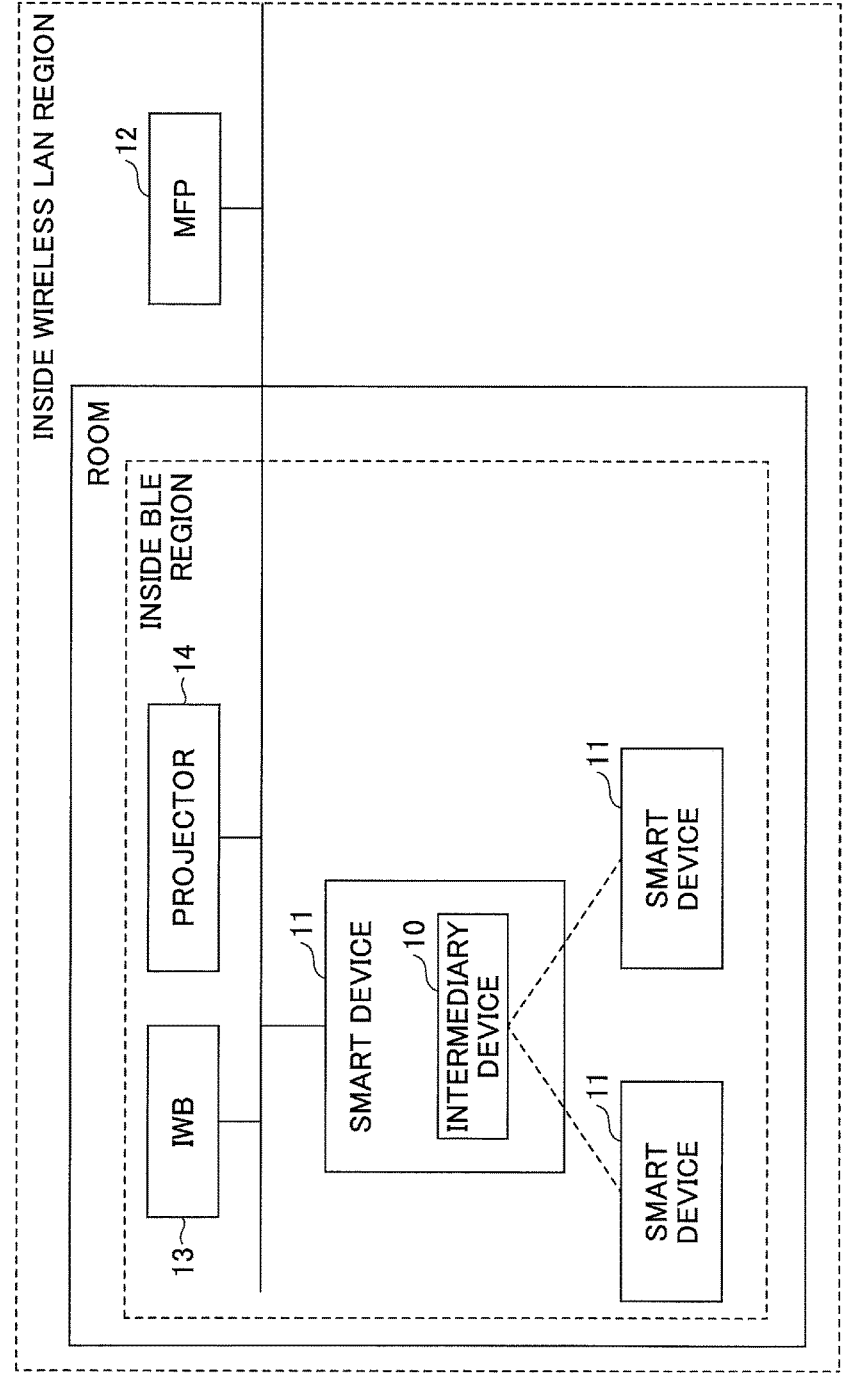
FIG. 30 is a schematic diagram illustrating another example of a communication system according to another embodiment of the present invention.
Figure 31:
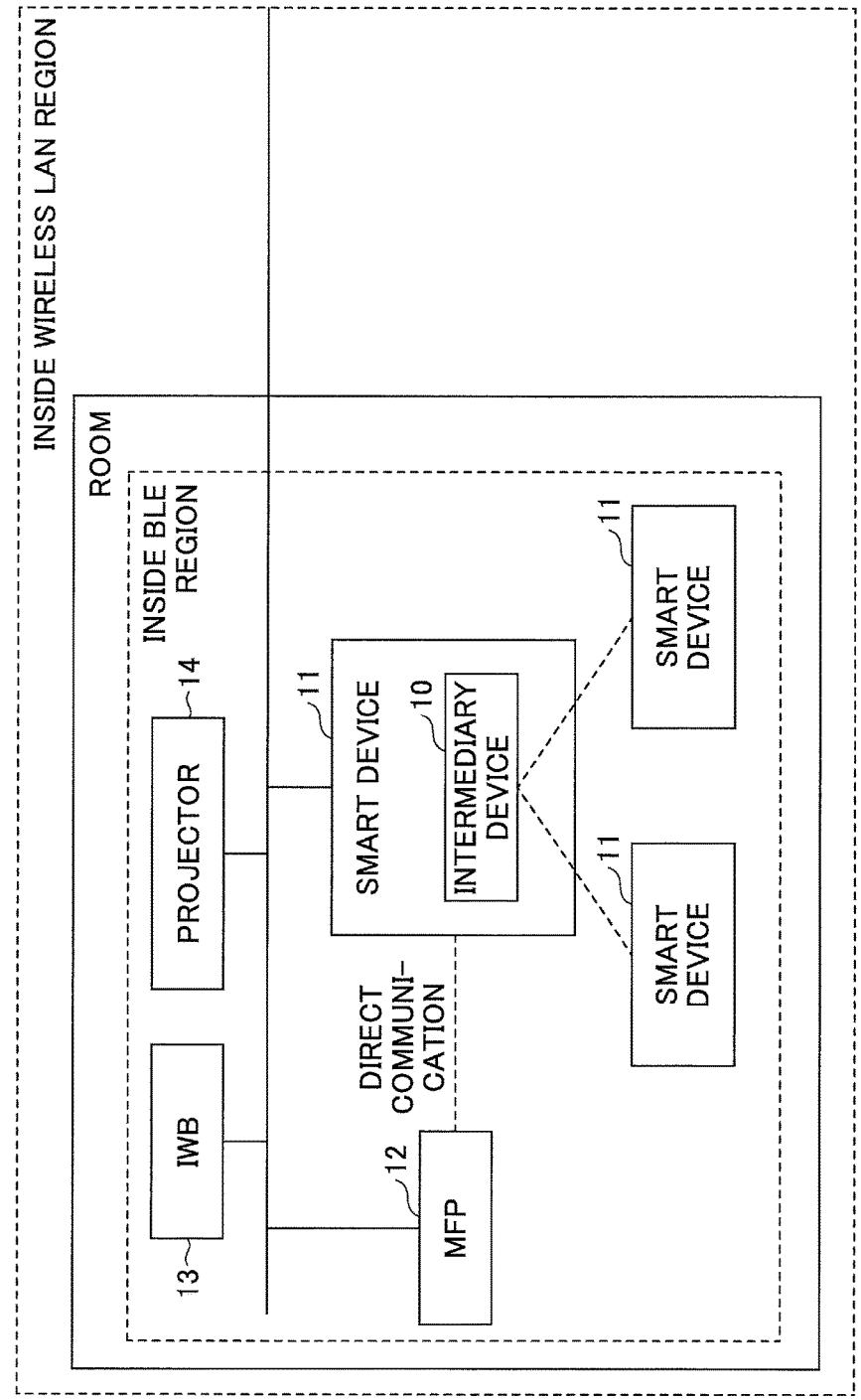
FIG. 31 is a schematic diagram illustrating yet another example of a communication system according to another embodiment of the present invention.

Alternatively, a function of the intermediary device 10 may be included in the electronic devices such as the smart device 11, the MFP 12, the IWB 13, and the projector 14 as illustrated in FIGS. 29 and 30. Further, the smart device 11 including a function of the intermediary device 10 may directly communicate with a MFP 12 connected to the network N1 as illustrated in FIG. 31.

The present invention is not limited to the specifically disclosed embodiments, and variations and modifications may be made without departing from the scope of the present invention. The smart device 11 is an example of an electronic device. The intermediary device 10 is an example of a communication apparatus.

The BLE network of the intermediary device 10 is an example of a first network. The wireless LAN network is an example of a second network. The BLE network of the removal device 15 is an example of a third network. The communication determination part 22 is an example of a determination unit. The access control part 23 is an example of an access control unit. The removal device 15 is an example of a removal unit.

The present application is based on and claims the benefit of priority Japanese Priority Application Nos. 2015-049943 and 2016-017938 filed on Mar. 12, 2015 and Feb. 2, 2016, respectively, with the Japanese Patent Office, the entire contents of which are hereby incorporated by reference.

What is claimed is:

1. A communication apparatus that communicates with at least one electronic device, the communication apparatus comprising:
a memory storing a program;
a processor configured to execute the program to implement processes of
transmitting connection data of a second network to the at least one electronic device by way of a first network;
communicating with the at least one electronic device by way of the second network in accordance with the connection data transmitted to the at least one electronic device;
storing in a storage unit, identification data of each of the at least one electronic device with which communication is established;
determining whether a first criterion is met indicative of the at least one electronic device not being authorized to communicate by way of the second network based on the identification data of each of the at least one electronic device stored in the storage unit;
prohibiting the at least one electronic device from accessing the communication apparatus by way of the second network upon determining that the first criterion is met;
changing the connection data upon determining that a second criterion is met indicative of the at least one electronic device not being authorized to communicate by way of the second network based on detection data of the at least one electronic device; and
transmitting the changed connection data to the at least one electronic device by way of the first network; and
a removal device;
wherein when the at least one electronic device is unable to communicate by way of the second network and is able to communicate by way of a third network, the removal device is configured to transmit a deletion request to the at least one electronic device requesting the at least one electronic device to delete the connection data, and
wherein when the at least one electronic device is unable to communicate by way of the second network and is able to communicate by way of the third network, the removal device is configured to delete the identification data corresponding to the at least one electronic device from the storage unit.

2. The communication apparatus as claimed in claim 1, wherein the at least one electronic device includes a target electronic device that is not authorized to communicate by way of the second network,
wherein the processor stores the identification data of the target electronic device in the storage unit upon determining that the first criterion is met, and
wherein the processor refers to the identification data stored in the storage unit and denies a request to connect with the second network from the target electronic device corresponding to the identification data stored in the storage unit.

3. The communication apparatus as claimed in claim 1, wherein if the processor determines that the at least one electronic device is authorized to communicate by way of the second network after determining the at least one electronic device is not authorized to communicate by way of the second network, the processor permits a request to connect with the second network from the at least one electronic device.

4. The communication apparatus as claimed in claim 3, wherein the first network and the second network are wireless communication networks that use the communication apparatus as a starting point, and
wherein a communication range of the first network is smaller than a communication range of the second network and is encompassed within the communication range of the second network.

5. The communication apparatus as claimed in claim 1, wherein a communication range of the third network covers a region different from a region covered by a communication range of the first network.

6. A method for controlling communication with at least one electronic device, the method comprising:
transmitting connection data of a second network to the at least one electronic device by way of a first network;
communicating with the at least one electronic device by way of the second network in accordance with the transmitted connection data;
storing identification data of each of the at least one electronic device that communicates by way of the second network;
determining whether a first criterion is met indicative of the at least one electronic device not being authorized to communicate by way of the second network based on the stored identification data of each of the at least one electronic device; and
prohibiting the at least one electronic device from accessing the communication apparatus by way of the second network if it is determined that the first criterion is met;
changing the connection data if it is determined that a second criterion is met indicative of the at least one electronic device not being authorized to communicate by way of the second network based on detection data of the at least one electronic device; and transmitting the changed connection data to the at least one electronic device by way of the first network;

wherein when the at least one electronic device is unable to communicate by way of the second network and is able to communicate by way of a third network, transmitting a deletion request to the at least one electronic device requesting the at least one electronic device to delete the connection data, and wherein when the at least one electronic device is unable to communicate by way of the second network and is able to communicate by way of the third network, deleting the stored identification data corresponding to the at least one electronic device.

7. A non-transitory computer readable storage medium storing a program for causing a computer to execute a method for controlling communication with at least one electronic device, the method comprising:

transmitting connection data of a second network to the at least one electronic device by way of a first network;

communicating with the at least one electronic device by way of the second network in accordance with the transmitted connection data;

storing identification data of each of the at least one electronic device that communicates by way of the second network;

determining whether a first criterion is met indicative of the at least one electronic device not being authorized to communicate by way of the second network based on the stored identification data of each of the at least one electronic device; and prohibiting the at least one electronic device from accessing the communication apparatus by way of the second network if it is determined that the first criterion is met;

changing the connection data if it is determined that a second criterion is met indicative of the at least one electronic device not being authorized to communicate by way of the second network based on detection data of the at least one electronic device; and transmitting the changed connection data to the at least one electronic device by way of the first network;

wherein when the at least one electronic device is unable to communicate by way of the second network and is able to communicate by way of a third network, transmitting a deletion request to the at least one electronic device requesting the at least one electronic device to delete the connection data, and wherein when the at least one electronic device is unable to communicate by way of the second network and is able to communicate by way of the third network, deleting the stored identification data corresponding to the at least one electronic device.

* * * * *